(12) United States Patent
Yamada

(10) Patent No.: US 7,075,451 B2
(45) Date of Patent: Jul. 11, 2006

(54) DELIVERY BOX SYSTEM AND RESERVING METHOD AND CHARGING METHOD THEREFOR

(75) Inventor: Shoichiro Yamada, Tokyo (JP)

(73) Assignee: X-Cube Co., Ltd., Tokyo (JP)

( * ) Notice: Subject to any disclaimer, the term of this patent is extended or adjusted under 35 U.S.C. 154(b) by 322 days.

(21) Appl. No.: 10/687,809

(22) Filed: Oct. 20, 2003

(65) Prior Publication Data

US 2005/0083176 A1    Apr. 21, 2005

(51) Int. Cl.
  *G08B 5/22* (2006.01)
  *G08B 29/00* (2006.01)
  *G01C 21/30* (2006.01)

(52) U.S. Cl. .............................. 340/825.49; 340/5.73; 701/210

(58) Field of Classification Search .......... 340/825.49, 340/539.2, 539.16, 539.17, 5.73
See application file for complete search history.

(56) References Cited

U.S. PATENT DOCUMENTS

| 5,946,660 | A | * | 8/1999 | McCarty et al. ............... 705/5 |
| 6,323,782 | B1 | * | 11/2001 | Stephens et al. ........... 340/5.73 |
| 6,791,450 | B1 | * | 9/2004 | Gokcebay et al. ......... 340/5.73 |
| 6,879,243 | B1 | * | 4/2005 | Booth et al. ............... 340/5.73 |
| 6,882,269 | B1 | * | 4/2005 | Moreno ..................... 340/5.73 |
| 2002/0052688 | A1 | * | 5/2002 | Yofu ........................... 340/995 |
| 2002/0173906 | A1 | * | 11/2002 | Muramatsu ................. 340/995 |
| 2003/0222760 | A1 | * | 12/2003 | Hara .......................... 340/5.73 |

* cited by examiner

*Primary Examiner*—Brian Zimmerman
*Assistant Examiner*—Clara Yang
(74) *Attorney, Agent, or Firm*—Townsend & Banta

(57) ABSTRACT

A delivery box system for delivering an article is providing, including a navigation device for sending and receiving reservation reguests and information, payment information, navigation execution ID information and position information of a particular related delivery box from a central computer of a central management center. The navigation device automatically calculates navigation information based on the navigation execution ID information, as well as guides the deliveryman from the present position thereof to the particular related delivery box based on the position information of the related delivery box received from the central computer.

14 Claims, 14 Drawing Sheets

FIG.8
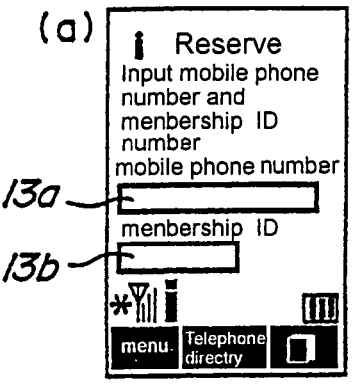
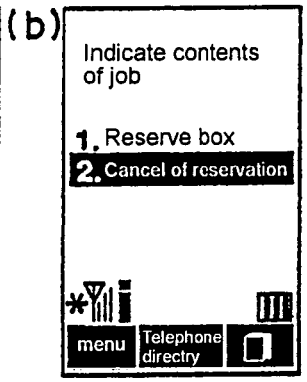
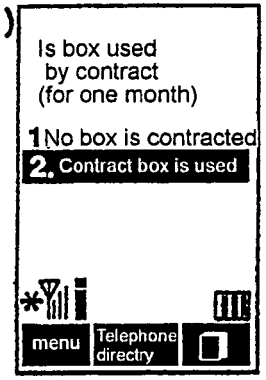
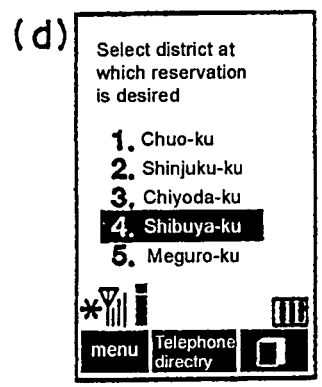
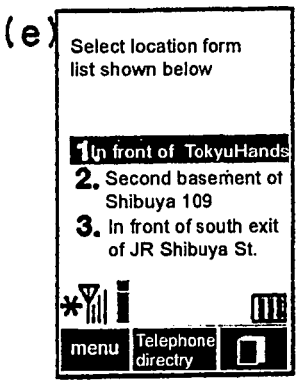
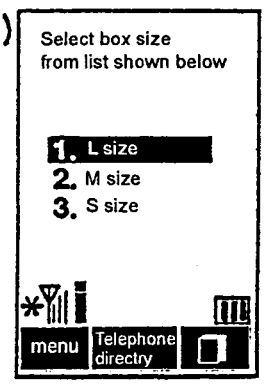
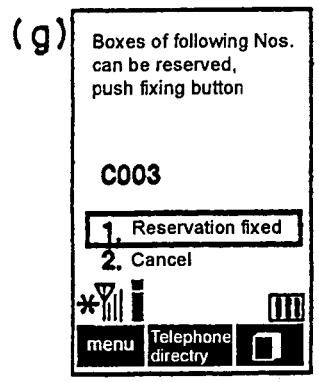
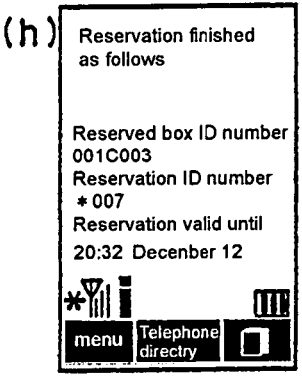
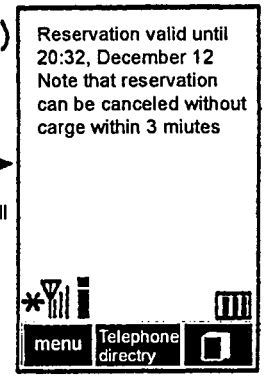
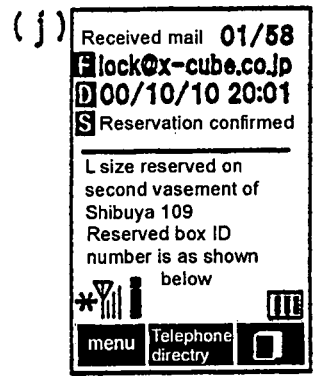
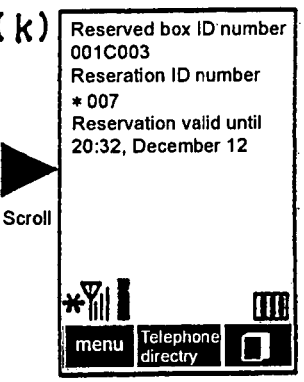

FIG.13
INQUIRY SCREEN                                14
INPUT RESERVED BOX ID NUMBER
INPUT RESERVATION ID NUMBER

FIG. 14
(a)
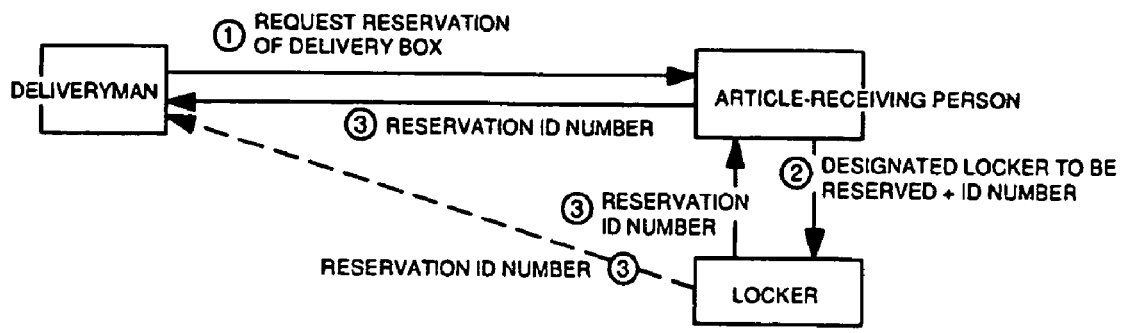
(b)
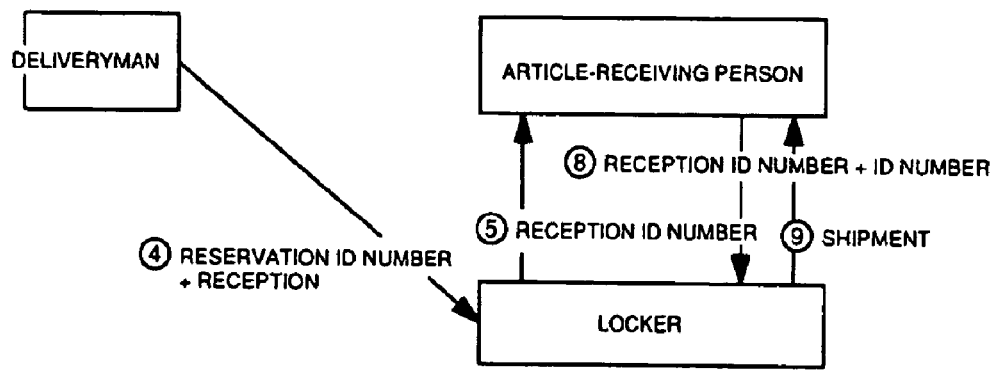
(c)
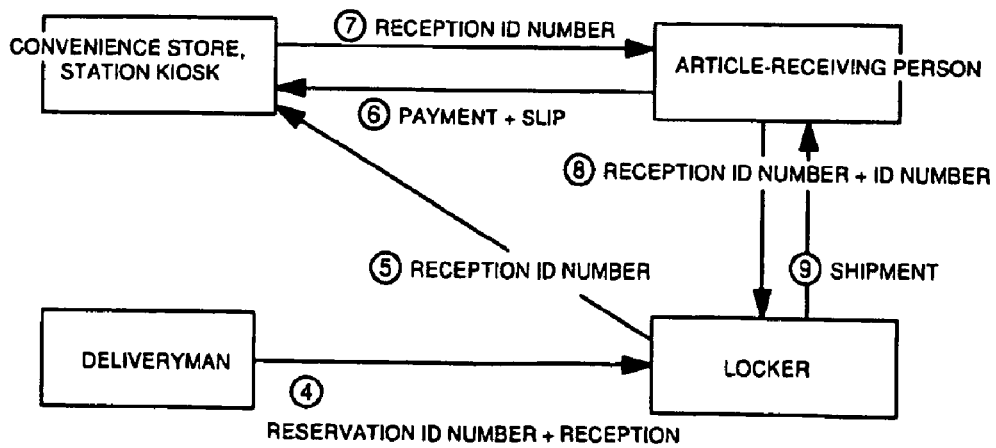

DELIVERY BOX SYSTEM AND RESERVING METHOD AND CHARGING METHOD THEREFOR

BACKGROUND OF THE INVENTION

1. Field of the Invention

The present invention relates to a delivery box system such as a mail box (including a post office box), a home delivery box, a cleaning box, a coin locker, and the like for delivering an article, and to a reserving method and a charging method making use of the delivery box system.

2. Description of the Related Art

Heretofore, as arts for guiding a route to lockers, there is an art in which a reception device and lockers are installed in a station yard, and a route from the reception device to a loker to be used is guided by a guide section provided in the reception device, as disclosed in Japanese Patent Application Laid-Open No. 2002-140632 (hereinafter, referred to as patent document 1).

In contrast, as arts for reserving an empty box, there is proposed a system for causing a deliveryman and the like to reserve an empty box of a home-delivered article accommodation locker installed in complex housing such as an apartment house and the like, as disclosed in Japanese Patent Application Laid-Open No. 11-151154 (hereinafter, referred to as patent document 2).

In the above known example, the data of the states of use and reservation of the home-delivered article accommodation locker is sent to a central management device through a telephone line, and the deliveryman directly reserves the home-delivered article accommodation locker through the telephone line using a mobile terminal device. Then, the deliveryman can unlock the locker after it is certified that he or she is the person who reserved the locker by a previously registered IC card inserted by the deliveryman or by a delivery firm's ID number input by him or her through ten keys.

Further, the applicant proposes a temporarily keeping box that can be unlocked for use by a mobile phone (Japanese Patent Application Laid-Open No. 2001-325660, hereinafter, referred to as patent document 3) and a delivery box which can be reserved by an article-receiving person (Japanese Patent Application Laid-Open No. 2002-150426, hereinafter, referred to as patent document 4).

However, in the known example disclosed in the patent document described above, a route to the location where the reception device is installed is not shown. Accordingly, when a deliveryman of an article and a person who receives an article are different from a person who leaves the article, there arises a troublesome problem in that the deliveryman or the article-receiving person must search the location where the lockers and the reception device are installed referring to a map based on an address and the like the deliveryman or the article-receiving person gets from the person who leaves the article.

Further, in the known example disclosed in patent document 2, a previously-registered deliveryman makes a reservation to the home-delivered article accommodation locker installed in a previously registered complex housing such as an apartment house and the like in order to deliver an article to users as article-receiving persons who are limited to the owner of the locker and to the habitants in the complex housing. Thus, it is impossible for outsiders to use the locker as article-receiving persons or deliverymen.

Furthermore, since persons who leave or receive an article in or from the accommodation locker, can ordinarily use it at no charge, the inhabitants or the owner of the apartment house cannot help bearing the expenses necessary to buy and maintain the accommodation locker. Accordingly, when it is intended to newly install a home-delivered article accommodation locker, the expenses for it must be borne by the inhabitants or the owner of the apartment house. Further, since a space in which the locker is installed must be acquired in a narrow entrance of the apartment house, it is difficult to additionally install a home-delivered article accommodation locker in an existing apartment house.

Moreover, in a system which unilaterelly is reserved or used by a deliveryman, a trouble is liable to occur because it is difficult to certify that an article-receiving person previously accepts to use a locker as a place where an article is delivered each time it is delivered, and further there is a problem in that a usage fee of the locker cannot be charged to the article-receiving person.

In addition, there is a home-delivered article box the usage fee of which is charged to a certain person (deliveryman) who leaves an article therein by a contract. In this case, when it is not apparent whether or not an article-receiving person receives an article, the person who leaves the article must go to the locker and collect the article, which naturally makes it impossible to employ a time-based usage fee system.

Further, there is a system that when a baggage is kept in a locker and the like, it is displayed on a display panel of the locker. However, since it is not directly notified to an article-receiving person and to an article-leaving person that the baggage is kept in the locker or taken out therefrom, smooth delivery of the baggage cannot be guaranteed.

Since there is not a system which allows to keep an article in a delivery box based on article delivery conditions including a payment condition to an article and to unlock the delivery box when it is confirmed that the article delivery conditions are fulfilled, it is impossible to use a locker for an article which must be delivered on the condition of cash on delivery.

Also, it cannot be said that even the arts disclosed in the patent documents 3 and 4 have not any problem. That is, these arts are disadvantageous in that since there is not a guide to the location where a usable box is installed, users such as a box-reserving person, a article-leaving paerson, a deliveryman, and an article-receiving person, who are not familiar with the location of the usable locker, must search it using a map, an address, and the like presented on the Internet, and this searching job is troublesome and time-consuming.

An object of the present invention, which has been made to solve the above problem, is to provide a delivery box system arranged such that delivery boxes are installed not only in complex housing such as apartment houses and the like but also in public locations such as the peripheries of stations, underground shopping arcades, shopping streets, and urban areas where many persons gather, a moving object can be guided to a moving destination while it is moving, an article-receiving person can easily reserve and use a delivery box, security can be improved by issuing a reservation ID number inherent to each reserving action, delivery of an article can be made on the condition of cash on delivery, and the article can be delivered after the approval of the article-receiving person is previously obtained as to an article delivery place and who bears the usage fee of the delivery box, and to a delivery box reserving method and a charging method making use of the delivery box system.

SUMMARY OF THE INVENTION

To achieve the above object, a delivery box system according to the present invention for delivering an article is characterized by comprising box position information storage means for storing position information of the positions where delivery boxes are installed; delivery box position information output means for outputting position information of a particular delivery box to be used from the position information stored in the box position information storage means; navigation means for measuring a present position of a moving body, displaying the present position of the moving body in map information corresponding to the present position of the moving body based on the measured position information as well as guiding the moving body from the present position thereof to a moving destination based on input moving destination information; navigation execution ID information relating means for relating the position information of the particular delivery box output by the delivery box position information output means to navigation execution ID information for executing navigation by inputting moving destination information to the navigation means; and navigation execution means for receiving the navigation execution ID information and the position information of the particular delivery box that are related to each other by the navigation execution ID information relating means, executing the navigation by the navigation means based on the navigation execution ID information as well as guiding the moving body from the present position thereof to the moving destination where the particular delivery box is installed by the navigation means based on the position information of the particular delivery box.

Since the present invention is arranged as described above, the position information of the particular delivery box to be used can be extracted and output from a plurality of position information, which is stored in the delivery box position information storage means, by the delivery box position information output means.

The position information of the particular delivery box is related to the navigation execution ID information by the navigation execution ID information relating means and received by the navigation execution means disposed to the moving body, the navigation execution means can execute navigation by means of the navigation means based on the navigation execution ID information received thereby as well as can guide the moving body from the present position thereof to the moving destination where the particular delivery box is installed through a display, a voice, and the like based on the position information of the particular delivery box.

Further, the delivery box described above is characterized by comprising a mobile phone capable of transmitting ID information; and unlocking control means for unlocking the delivery box by receiving the ID information transmitted from the mobile phone through a transmitting/receiving unit having a phone function and checking the ID information between the mobile phone and the transmitting/receiving unit.

According to the above arrangement, when a user transmits the ID information through the mobile phone, the ID information from the mobile phone is checked against the ID information previously registered in the memory disposed to the unlocking control means or to the computer of the central management center, and when the former ID information coincides with the latter ID information, only a user, who is allowed to unlock the delivery box, can easily unlock it.

Further, in a case that the ID information is set to the phone number information of the mobile phone itself, when a phone call is made to a preset phone number of a predetermined delivery box, the phone number information can be easily transmitted as the ID information making use of the function of the mobile phone itself for automatically transmitting the phone number information.

Since the phone number of the mobile phone itself is previously registered, the user can be easily identified, which permits to unlock the delivery box without checking the ID information. Further, security can be more improved by adding identification, which utilizes ID number information and voice print information, to the ID information.

When the mobile phone can utilize the Internet and obtain at least one of the installed position information of the delivery boxes, passed-time based usage fee information, article reception/shipment information, and empty state information through the Internet, it is easy to find a delivery box that is empty at present and can be used, an article delivery state, and a passed-time based usage fee.

When the usage fee of the delivery box is charged to the phone number of the mobile phone, the fee can be easily charged as a toll.

Further, when unlocking of the delivery box can be frozen by remote control to reserve delivery box from the mobile phone, the delivery box can be easily and reliably reserved.

When the delivery box system comprises: empty state detection means for detecting an empty state of the delivery boxes; first communication means for collecting the empty state information detected by the empty state detection means and transmitting it to a central management center; first storage means for storing the empty state information transmitted to the central management center at any time; a server device for presenting the empty state information stored in the first storage means on a communication network such that it can be accessed; reservation selection means for selecting a delivery box the reservation of which is desired based on the empty state information accessed on the communication network; second storage means for storing reserved box ID information of the delivery box selected by the reservation selection means and reservation ID information, which is related to ID information such as the phone number and the like of the mobile phone of a box-reserving person that is inherent to a reserving action issued by the central management center when the reservation is accepted in a state that the reserved box ID information is related to the reservation ID information; second communication means for transmitting and notifying the reserved box ID infoemation and the reservation ID information to the box-reserving person; input means for inputting the reserved box ID information of the delivery box and the reservation ID information; and unlocking control means for checking the reserved box ID information and the reservation ID information input by the input means against the reserved box ID information and the reservation ID information stored in the second storage means and unlocking the delivery box when the former information coincides with the latter information, the empty state information of the delivery boxes detected by the empty state detection means is transmitted to the central management center and managed thereby at any time and further presented on the communication network by the server device such that it can be accessed.

The user can select and reserve a delivery box which he or she desires to reserve based on the empty state information accessed on the communication network, and when the central management center accepts the reservation, it issues reservation ID information that is related to the ID information such as the phone number and the like of the mobile phone of the user, i.e. a box-reserving person and is inherent to the reserving action. The box-reserving person is notified with reserved box ID information inherent to the delivery box selected and reserved by him or her and with reservation ID information that is issued by the central management center.

Since the reservation can be made from any unspecified communication terminal located at any place through the widespread Internet, the communication terminal used to make the reservation is not limited to a specific terminal as in the known example disclosed in the patent document 2, and thus the delivery box system of the present invention has good usability.

When integrated services digital network (ISDN) lines are used or when a plurality of lines, which are composed of ordinary telephone lines and asymmetric digital subscriber lines (ADSL) appropriately combined with each other, are used, ones of them can be used as lines dedicated for the communication of various information and the others of them can be used as lines dedicated for the communication of the ID information, thereby security can be improved by using the telephone lines, which transmit information without passing through providers and the like, as the lines dedicated for the communication of the ID information.

Since the phone number of the mobile phone is transmitted together with a serial ID number of the mobile phone itself in addition to the phone number, even if the mobile phone is lost, it can be made ineffective making use of the serial ID number, which enables to use the phone number of the lost mobile phone as the phone number of a new mobile phone.

Making a reservation effective only for a predetermined period of time eliminates that a delivery box is reserved for an unlimited period of time, thereby the empty state of the delivery boxes can be prevented as much as possible. As a result, the capacity utilization of the delivery boxes can be improved as well as it is possible to separately set a reservation fee and a usage fee.

The box-reserving person or an article-leaving person, who is notified with the reserved box ID information and the reservation ID information from the box-reserving person, goes to the reserved delivery box by being guided by the navigation means, unlocks the delivery box, and can use it by inputting the reserved box ID information and the reservation ID information through the input means. That is, since the reservation ID information is notified to a specified article-leaving person such as a deliveryman and the like as information in place of a key, it is not necessary to send a key to him or her, there is not a possibility that the key is lost and that an article is left by a prank, and further it is not necessary to worry about whether or not an delivery box is available.

The reservation ID information issued by the central management center is inherent to a reserving action and different reservation ID information such as a different ID number and the like is given to each reserving action, it is not necessary for the article-leaving person to previously secure a delivery box dedicated to him or her, and it is necessary to worry about that an IC card is stolen or lost and that the information of fixed password is leaked.

At the time the article-leaving person puts an article into the reserved delivery box, article-keeping ID Information other than the reservation ID information (ID information, for example, reservation password ID information, the phone number of the mobile phone of an article-receiving person, and the like) is notified to the box-reserving person (article-receiving person) together with a fact that the article has been put into the delivery box from the central management center through an e-mail, a voice mail, a phone call, and the like. Note that since the article-keeping ID Information is not notified to the article-leaving person, a high level of security can be maintained when the article is left.

The article-receiving person inputs the article-keeping ID Information serving as the key when the article is received as well as is get identified using ID means such as a mobile phone, an IC card, a magnetic card, and the like and can receive the article by unlocking the delivery box. Note that when the phone number of the mobile phone is used as reception ID information, it is also possible to unlock the delivery box and to receive the article only by notifying the phone number of the mobile phone.

In the delivery box system that comprises: input means for inputting reservation ID information, which is related to ID information such as the phone number and the like of the mobile phone of a box-reserving person that is inherent to a reserving action issued by the central management center when the reservation of the delivery box or keeping of an article is accepted or for inputting article delivery conditions such as a payment to the article, and the like which are related to reception ID information that is related to ID information such as the phone number and the like of the mobile phone inherent to the delivery action of the article executed making use of the delivery box; storage means for storing the article delivery conditions and the fulfillment thereof; third communication means for transmitting and notifying the reception ID information only to a payment agent when the article delivery conditions are accompanied with a payment for the article; payment means for making a payment to the article; fourth communication means for inquiring the fulfillment of a payment by a separate payment method by transmitting the inquiry to the central management center; and unlocking control means for unlocking the delivery box when the box ID information of the delivery box and the reception ID information coincide with those stored when the reservation or the leaving of the article is accepted after it is confirmed that the article delivery conditions are fulfilled, when the article delivery conditions are accompanied with the payment for the article, the unlocking control means unlocks the delivery box after it is confirmed that the article delivery conditions, which are related to the reservation ID information and the reception ID information and stored in the storage means, are fulfilled, thereby the payment to the article can be securely made prior to the delivery of the article.

Any one of a mobile phone, a personal digital assistant, a personal computer, and ten keys and a touch panel disposed to the delivery box can be appropriately used as the input means and/or the second to fourth communication means.

When the mobile phone, the personal digital assistant, the personal computer, and the ten keys and the touch panel disposed to the delivery box can make use of the Internet and obtain at least one of the installed position information of the delivery boxes, usage fee information based on a passed time, article article reception/shipment information, empty state information, article keeping request information, and article keeping acceptance information through the Internet, the delivery box system which is empty at present can be easily found and used, the delivery state of the article can be easily found, and a usage fee based on a passed time can be easily found.

In the delivery box system, in which the input means and/or the second to fourth communication means are the mobile phone, and the phone number of the mobile phone or the voice of a call therethrough also acts as ID information at the time the delivery box is reserved or at the time the article is left or taken out, or it is used to charge the usage fee of the delivery box, when the phone number of the mobile phone is previously registered as a membership ID number, i.e. personal ID information, as a delivery box unlocking number such as a reception ID number and the like, and as a number to which a fee is charged, a member can be easily identified, the fee can be easily charged, and the phone number can be provided with the role of a key for unlocking the delivery box. Further, when the voice of a call through the mobile phone is identified by a vocal print, it can be used in place of the personal ID information.

Accordingly, since a subscriber of a mobile phone can be automatically handled as a member, it can be omitted to input a personal ID number, an unlocking password and a subject to be charged, thereby operability can be improved.

Further, when a reservation or leaving of an article is requested through ten keys or a touch panel, which also acts as display means, each disposed on the delivery box, the delivery box can be also used by reading the IC card, the magnetic card, a credit card, and the like, which are used as identifying means, with a card reader in place of the phone number of the mobile phone.

Further, a method of reserving a delivery box according to the present invention for delivering an article is characterized by comprising the steps of requesting an article-receiving person, who receives an article, to reserve a delivery box according to any one of claims 1 to 11 by an article-leaving person who leaves the article; and reserving the delivery box by the article-receiving person on behalf of the article-leaving person.

According to the above reserving method, since the article-leaving person, who desires to leave the article in one of the delivery boxes, requests a box-reserving person to reserve a particular delivery box and the box-reserving person makes a reservation making use of the delivery box described above, the reservation is made by the article-receiving person on behalf of the article-leaving person, that is, on behalf of a third person. This reserving action certifies that the article-receiving person, who has reserved the delivery box, agrees to receive the article using the delivery box installed in a public place as an article delivery place. Accordingly, when the article-leaving person is a deliveryman, it is not necessary for the deliveryman to previously certify whether or not the article-receiving person agrees to make the delivery of the article at the delivery box in each case, and thus the article-leaving person such as a delivery firm and the like can utilize the delivery box as an article delivery place with security.

Even if a request for keeping the article is previously accepted, the same effect can be expected because the fact of acceptance is stored in the computer and the record of it is printed out.

Further, since the usage fee of the delivery box can be charged to the article-receiving person who is the box-reserving person, the article-leaving person can utilize the delivery box at ease because he or she need not worry about the usage fee.

In contrast, when the article-leaving person is the box-reserving person as in the known example of the patent document 2 described above, the usage fee is charged to the article-leaving person. Thus, when a time-based usage fee system is employed, if the delivery of an article is not yet completed after it is kept in the delivery box, a usage fee is continuously charged to the article-leaving person. As a result, the article-leaving person cannot help paying attention to the time at which the article-receiving person received the article, and thus the article-receiving person cannot determine an article receiving time at his or her convenience, from which a disadvantage occurs in that the article-receiving person must receive the article as rapidly as possible. Further, when the article-receiving person does not receive the article, a troublesome job occurs in that the article-leaving person must collect the article once and bring it to the delivery box again.

Further, in the known example of the patent document 2, since the article-leaving person cannot get approval for using a locker of a home-delivery-box as an article delivery place from the article-receiving person each time the locker is used, which is also disadvantageous to the article-leaving person. When an approval cannot be previously obtained from the article-receiving person or when a usage fee is charged to the article-leaving person, the delivery of an article is not completed by simply leaving the article in the delivery box, from which a trouble may occur.

In the delivery box system of the present invention, since the article-receiving person, who is also the box-reserving person, makes the reservation after the article-leaving person is identified (after it is clarified the that for whom the reservation is made) and then unlocks the delivery box, there is not any risk in that unnecessary article such a stone, garbage and the like is sent to the locker by a prank freely.

Further, the article cannot be kept in the delivery box unless the ID information of the article-leaving person, who leaves the article in the delivery box, is obtained and at the same time the ID information of the article-receiving person is input, a high degree of security can be achieved and the acceptance of the article-receiving person can be certified by the above system.

Since the phone number of the mobile phone of the article-receiving person is notified when he or she makes a phone call to a previously designated phone number through the mobile phone, the phone number of the mobile phone of the article-receiving person can be used as means for finally confirming the article-receiving person.

Furthermore, a method of charging the usage fee of the delivery box according to the present invention that is used to the delivery of an article is characterized in that the box-reserving person, who makes a reservation making use of the delivery box described above, is previously registered and the usage fee of the delivery box is charged to the box-reserving person (article-receiving person) when he or she makes a reservation.

According to the above charging method, since the usage fee of the delivery box is charged to the box-reserving person (article-receiving person), a payment to the usage fee of the delivery box can be made based on cash on delivery (payment is made when the article is taken out), which allows to employ a time-based fee system to the usage fee of the delivery box. When, for example, the time-based fee system of the delivery box is employed by charging the usage fee to the article-leaving person, there is a possibility that the usage fee is continuously charged until the article-receiving person receives the article, which makes it difficult to employ the time-based fee system.

It is also possible to construct a usage fee collection system (credit system) of the delivery box by previously registering the box-reserving person (article-receiving person) as a member.

Moreover, it is preferable to charge the usage fee of the delivery box to the phone number of the mobile phone used by the box-reserving person because the usage fee can be easily charged.

Another method of charging the usage fee of the delivery box according to the present invention for making the delivery of an article is characterized in that when the delivery box described above is used, an initial fee is charged to the article-leaving person who leaves an article.

According to the above charging method, since the reservation fee and the time-based usage fee can be charged to the box-reserving person (article-receiving person) and the initial fee for using the delivery box can be charged to the article-leaving person, the fees can be charged to various persons, which can reduces the expense born by the box-reserving person (article-receiving person) and contributes to prevent a prank.

BRIEF DESCRIPTION OF THE DRAWINGS

FIGS. 8A to 8K are views showing examples of a display screen when a reservation is made making use of a mobile phone;

FIG. 13 is a view showing an inquiry screen used when reserved box ID information and reservation ID information are input in the delivery box according to the present invention; and FIG. 14 is a view explaining a process for executing a cash on delivery transaction making use of the delivery box system according to the present invention.

DESCRIPTION OF THE PREFERRED EMBODIMENTS

Figure 1:
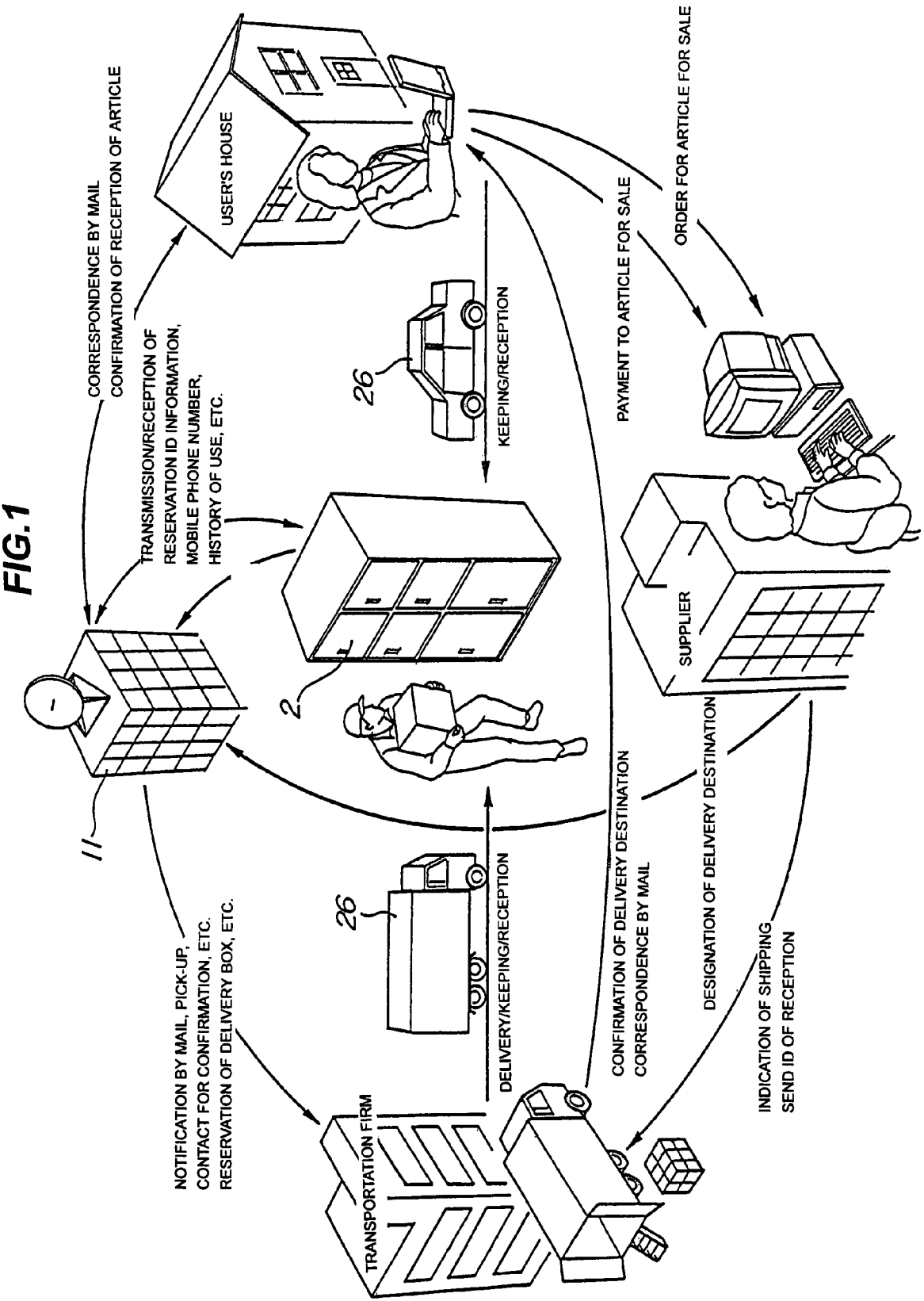
FIG. 1 is a view showing the overall arrangement of a delivery box system according to the present invention.

An embodiment of a delivery box system and a reserving method and a charging method for the system will be specifically explained with reference to the figures. FIG. 1 is a view showing the overall arrangement of the delivery box system according to the present invention, FIG. 2 is a diagram showing the arrangement of a control system of the delivery box system according to the present invention, and FIG. 3 is a block diagram showing a central management center and a control system of a navigation system disposed to a moving body.

Figure 5:
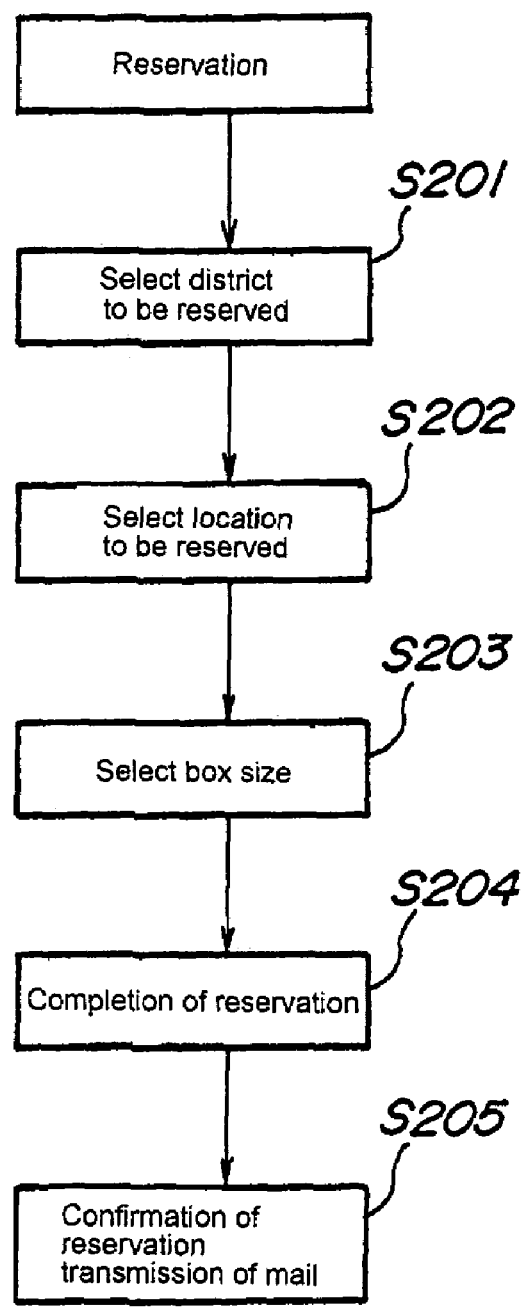
FIG. 5 shows a reservation flowchart when a delivery box is reserved in the delivery box system according to the present invention.
Figure 6:
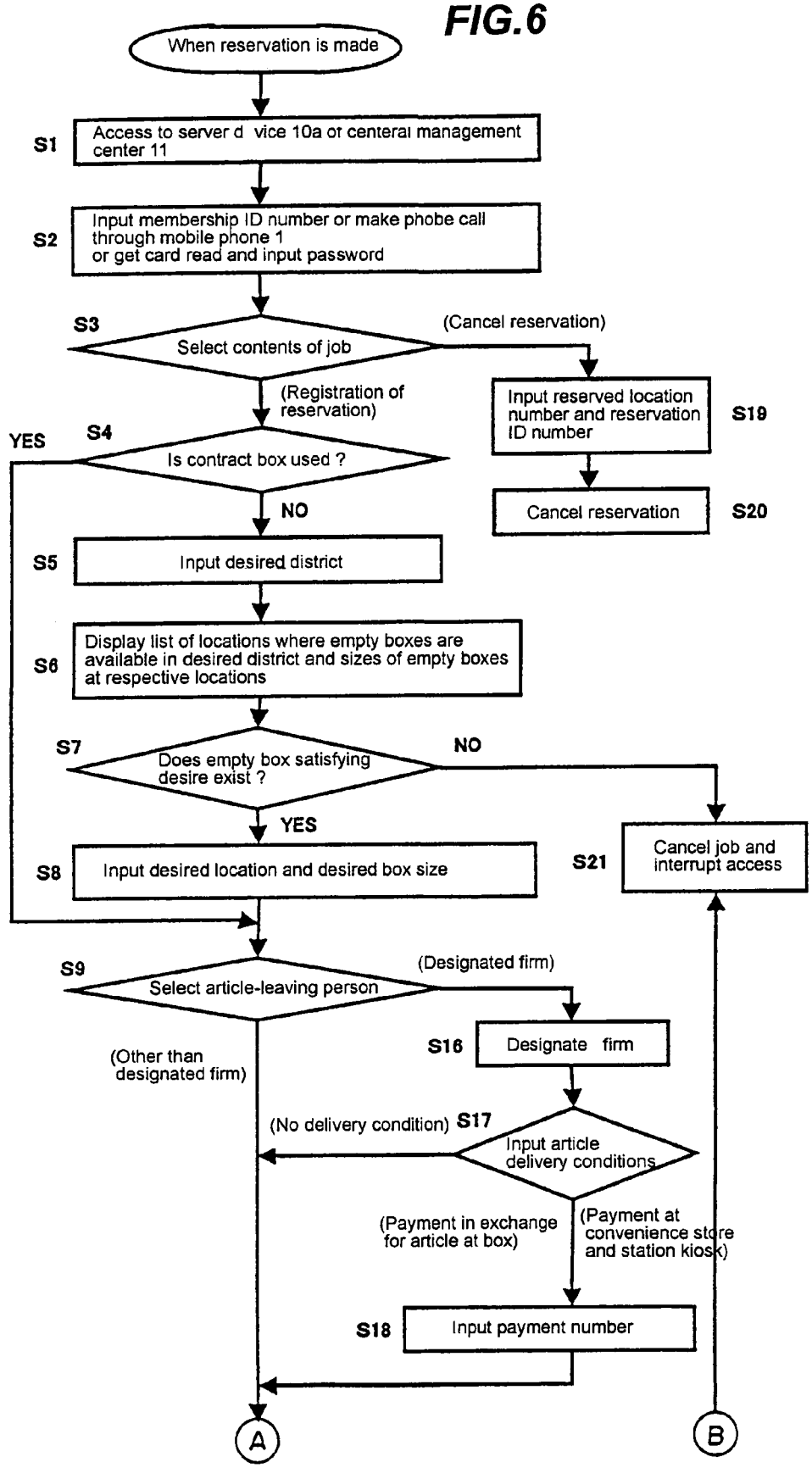
FIG. 6 shows a reservation flowchart when the delivery box is reserved in the delivery box system according to the present invention.
Figure 7:
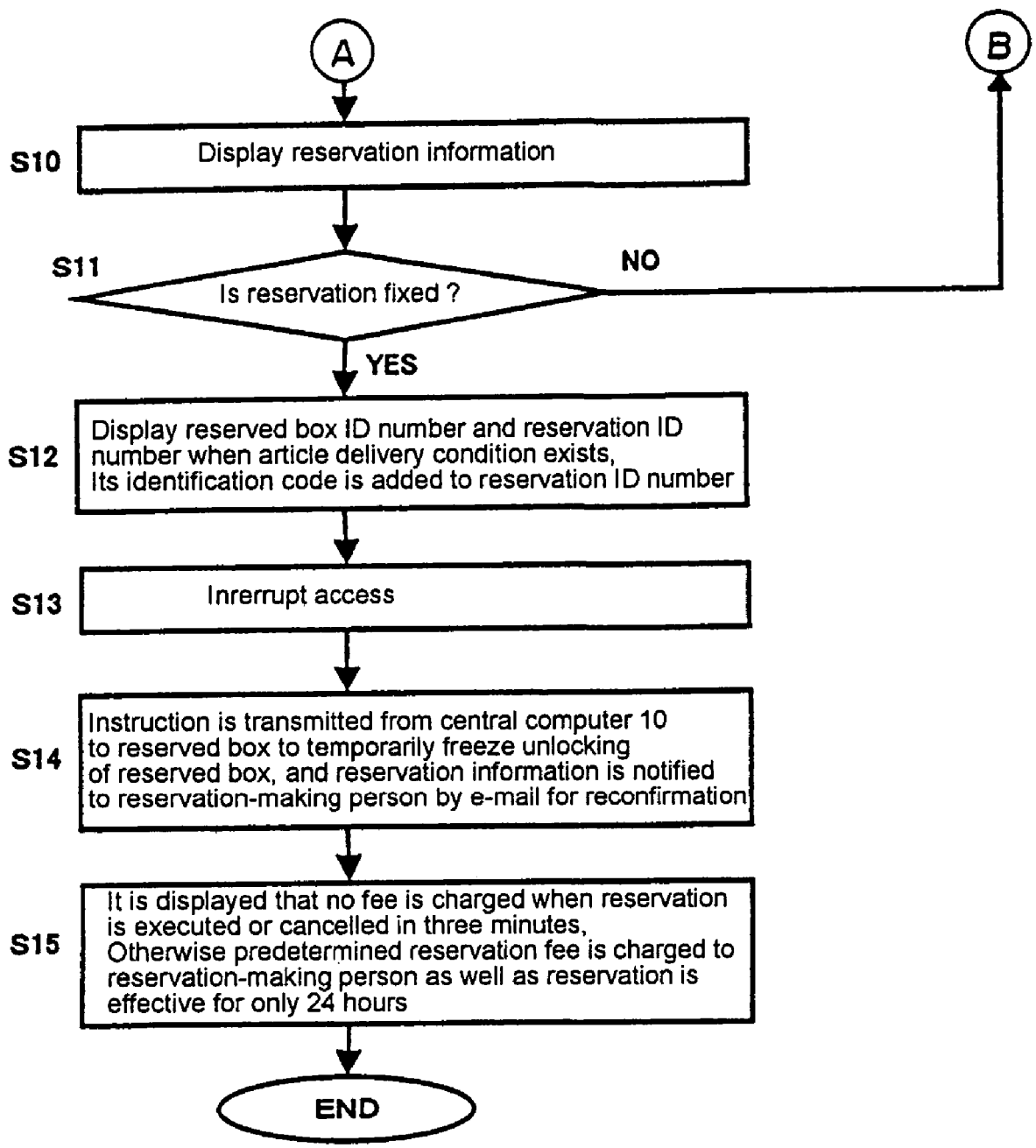
FIG. 7 shows a reservation flowchart when the delivery box is reserved in the delivery box system according to the present invention.

FIGS. 5 to 7 show reservation flowcharts when a delivery box is reserved in the delivery box system according to the present invention, FIGS. 8A to 8K are views showing examples of a display screen when a reservation is made making use of a mobile phone, FIGS. 9 to 12 are flowcharts showing sequences when an article is left in the delivery box and when it is received therefrom according to the present invention, FIG. 13 is a view showing an inquiry screen used when reserved box ID information and reservation ID information are input in the delivery box according to the present invention, and FIG. 14 is a view explaining a process for executing a cash on delivery transaction making use of the delivery box system according to the present invention.

Figure 2:
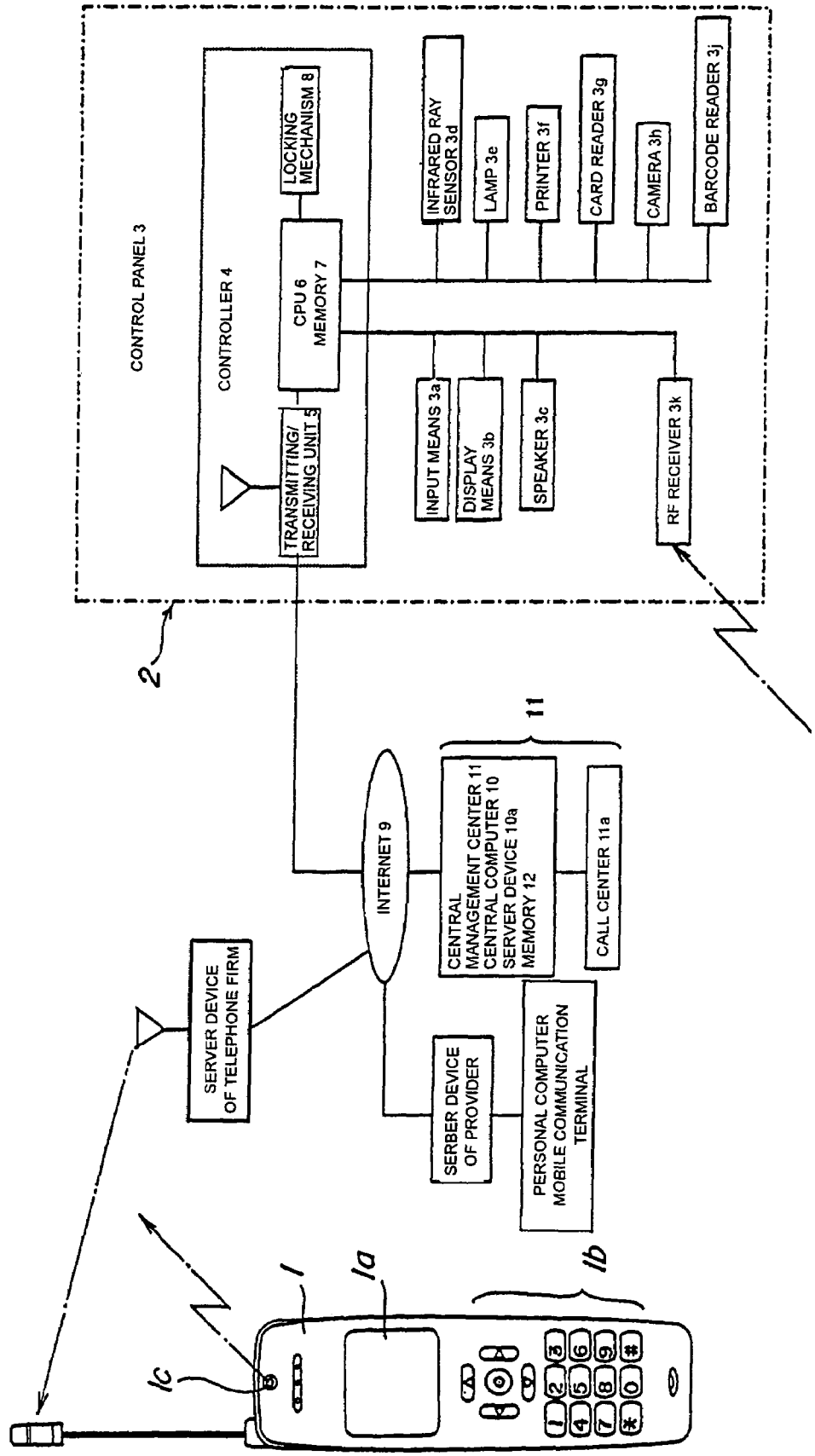
FIG. 2 is a diagram showing the arrangement of a control system of the delivery box system according to the present invention.
Figure 3:
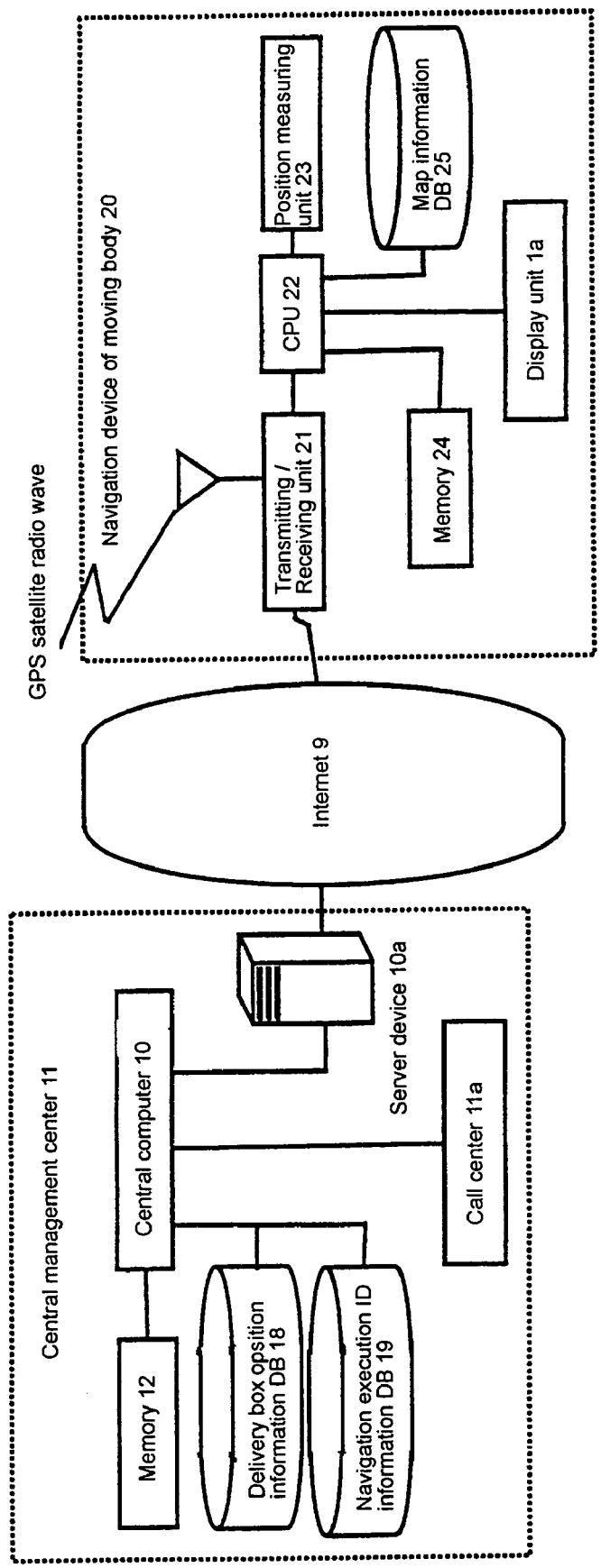
FIG. 3 is a block diagram showing a central management center and a control system of a navigation system disposed to a moving body.
Figure 4:
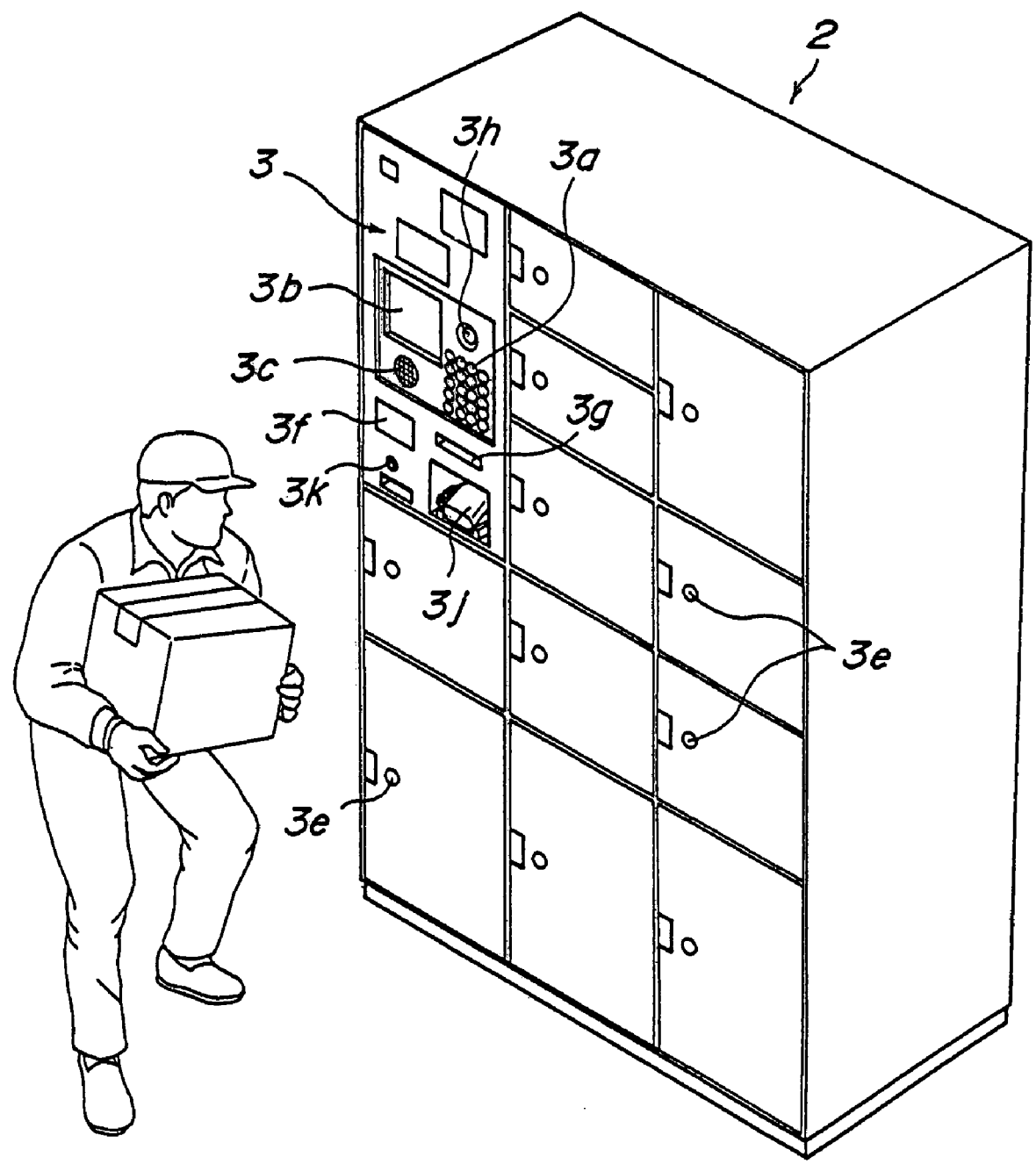
FIG. 4 is a perspective view showing an example of the delivery box.

In FIGS. 1, 2, and 4, reference numeral 2 denotes a delivery box for delivering an article. The delivery box 2 is installed not only in complex housing such as an apartment house and the like where it can be used as a mail box (including a post office box), a home-delivery box, a cleaning box, and the like but also in a public location where many persons gather such as the periphery of a station, an underground shopping arcade, a shopping street, a busy urban area, and the like. Further, the delivery box 2 can be also used to the delivery of rental video tapes, photographs (DPE), and the like and used as a locker.

The delivery box 2 for making delivery of articles is provided with a control panel 3 having input means 3a such as a touch panel acting also as ten keys and a display panel, a microphone and the like, display means 3b such as a liquid crystal display unit, a CRT display unit, and the like, and further a speaker 3c, a printer 3f, a card reader 3g, a camera 3h, a barcode reader 3j, a radiowave receiver 3k, and the like each disposed on the control panel 3. Further, the control panel 3 is provided with a not shown person sensor and the like for detecting a person standing in front of the control panel 3.

In contrast, a central management center 11, which is connected to the control panel 3 through communication means such as the Internet 9 and the like, is provided with delivery box position information database (hereinafter, referred to as "delivery box position information DB") 18 as shown in FIG. 3. The delivery box position information DB 18 acts as delivery box position information storage means for previously storing the position information of the delivery boxes 2 installed at various positions. The position information includes the addresses of the locations of the delivery boxes 2, the specific locations at the addresses at which the delivery boxes 2 are installed, and further the detailed position of a box in a particular delivery box 2 which indicates that the box is positioned on any of the right, left, upper and lower sides of the delivery box.

In FIG. 2, reference numeral 1 denotes a mobile phone capable of using the Internet, and the mobile phone is, for example, a mobile phone corresponding to the "i mode" (trade mark) provided by NTT DoCoMo Co. Ltd. Note that, in this embodiment, a PHS (personal handy phone system) is also included in the mobile phone 1.

Various types of online services such as a service for connecting the mobile phone 1 to the Internet site (information programs), an i mode mail service, and the like can be utilized by a button input operation executed through a display 1a and so-called ten keys, which include numeral keys 1 to 9 and symbol keys # and *, each provided with the mobile phone 1.

In the mobile phone 1 corresponding to the i mode, the owner of the mobile phone 1 can inquire a balance of a bank account, can transfer money into the bank account, reserve various tickets, search a phone number from an electronic telephone directory, and make use of various on-line services such as weather forecast, stock market information, news flash, restaurant guides and the like presented by information service firms even if the bearer of the mobile phone 1 is in a place out of the house or is on the move. Further, an internet mail (e-mail) can be transmitted between the mobile phones 1 each corresponding to the i mode and between personal computers connected to other Internet.

Note that a communication network, which employs an aerial radio wave making use of a dedicated line, a communication satellite, and the like, may be used in place of the Internet.

The mobile phone 1 is provided with a radiowave transmitter 1c of a short distance radio standard, such as Bluetooth™ and the like, thereby a short distance radio communication between the mobile phone 1 and the radiowave receiver 3k disposed on the delivery box 2's control panel 3.

According to the infrared ray communication executed by the Bluetooth and the like employing the short distance communication standard, the mobile phone 1, a personal digital assistant (PDA) and the like can directly access to a CPU (central processing unit) 6 of the delivery box 2 connected to the Internet 9 or to the telephone line through short distance radio waves without the connection to a cable in an underground shopping arcade, a building (including the inside of a room), a station yard, an airport yard, a community facility yard, and the like which are ordinarily areas outside of the reach of radio waves, and the mobile phone 1, the personal digital assistant (PDA) and the like can send and receive information to and from a central computer 10 of the central management center 11 through the CPU 6.

Accordingly, the phone number information of the mobile phone 1 itself, ID number information, barcode information, and voice print information, which are examples of ID information, and the digital information of digital image information can be transmitted between the mobile phone 1, which can transmit the ID information, and the control panel 3 of the delivery box 2. The ID information transmitted from the mobile phone 1 is received by a transmitting/receiving unit having a phone function and checked, thereby the delivery box 2 can be unlocked by controlling a locking mechanism 8 by the CPU 6 acting as unlock control means.

Further, the phone number and the like, which serve as personal ID information, of the mobile phone 1 are automatically input from the mobile phone 1 to the control panel 3 through the telephone line.

As shown in FIG. 3, the mobile phone 1 of this embodiment has a navigation device 20 acting as navigation means of a moving body and assembled therein. The navigation device 20 receives satellite radio waves from a global positioning system (GPS) through a transmitting/receiving unit 21 and measures the present position of the moving body (here, a person equipped with the mobile phone 1) through a position measuring unit 23. Then, map information corresponding to the present position of the moving body is displayed on the display 1a acting as display means from map information database (hereinafter, referred to as "map information DB") 25 acting as map information storage means based on the measured position information as well as the present position of the moving body is displayed in the map information.

In addition, the navigation device 20 has a function capable of displaying a route from the present position of the moving body to a moving destination on the display 1a based on the input moving designation information. Note that when the moving body is guided from the present position to a moving destination where a particular delivery box 2 is installed by the navigation device 20 based on the position information of the particular delivery box 2, it may be guided by a voice guide from a speaker, in addition to the guide executed by the display on the display 1a.

As shown in FIG. 2, a controller 4, which acts as unlocking control means, is disposed in the control panel 3 on the delivery box 2. The controller 4 unlocks the door of the delivery box 2 when reservation ID information to be described below and reserved box ID information, for example, the number of a reserved delivery box 2 inherent to it are checked against and the reservation ID number and the reserved box ID information, which are input by a box-reserving person or an article-leaving person through the input means 3a and the former information coincides with the latter information. The above reservation ID information is a reservation ID number and the like, which are inherent to a reserving action transmitted from the central computer 10 disposed in the central management center 11 when the reservation of the delivery box 2 or leaving of an article therein is accepted and which are related to the ID information, for example, the phone number and the like of the mobile phone 1 of the box-reserving person.

Further, a lamp 3e is disposed on the surface of each of the delivery boxes 2 to indicate an empty state, a reserved state, an article receiving state, and the like as well as an infrared ray sensor 3d is disposed in each of the the delivery boxes 2. The infrared ray sensor 3d constitutes a part of empty state detection means for detecting the empty state of the delivery box 2 and detects whether or not an article exists therein. Note that various other sensors such as a weight sensor and the like may be applied to the delivery box 2, in addition to the infrared ray sensor 3d.

The controller 4 includes a transmitting/receiving unit 5, the CPU (central processing unit) 6, a random access memory 7 acting as storage means capable of reading and writing information, and the locking mechanism 8 for locking and unlocking the door of delivery box 2. The transmitting/receiving unit 5 has a communication function for transmitting and receiving the reserved box ID information, the reservation ID information, which is issued by the central management center 11 when the reservation is accepted, and further oral, character and image information between it and the central computer 10.

The CPU 6 reads out programs and various data from the memory 7, makes a necessary calculation and decision, and executes various controls. Further, the CPU 6 has a calendar function, a watch function, a timer function, a counter function, and the like.

Further, the CPU 6 determines the empty state of the delivery boxes 2 from the empty state information detected by the respective infrared ray sensors 3d, collects the information, and transmits the empty state information of the delivery boxes 2 and various recorded data as to the management of the delivery boxes 2 to the central computer 10 disposed in the central management center 11 shown in FIG. 2 from the transmitting/receiving unit 5 acting as the communication means through the Internet 9 acting as the communication network.

A server device 10a of the central computer 10 supplies information as to the locations where the delivery boxes 2 are installed, a passed-time based usage fee, reception and shipment of articles, an empty state, a request for keeping articles, an acceptance for leaving articles, and the like through a web site (home page) on the Internet 9 so that users can access the information. Accordingly, the users can obtain the information through the mobile phone 1, personal digital assistant, personal computer, and the like that act as communication means capable of making use of the Internet 9.

Moreover, the CPU 6 acting as the unlock control means measures a period of time passed from a time at which the door of the delivery box 2 is unlocked by the locking mechanism 8 to a time at which the infrared ray sensor 3*d* detects that an article is put into the delivery box 2. When the measured period of time exceeds a preset period of time, the CPU 6 automatically locks the door of the delivery box 2 through the locking mechanism 8.

The memory 7 is composed of a working area, a buffer area and the like. The working area temporarily stores the data being executed by the CPU 6, a result of an arithmetic operation executed by the CPU 6, and the reserved box ID information and the reservation ID information input from the input means 3*a* as well as temporarily stores the reserved box ID information and the reservation ID information transmitted from the central management center 11. The buffer area stores various types of programs for operating the CPU 6 and various types of data.

The CPU 6 compares the reserved box ID information and the reservation ID information, which are input from the input means 3*a* and stored in the memory 7, with the reserved box ID information and the reservation ID information, which are transmitted from the central management center 11, and when the former information coincides with the latter information, the door of the delivery box 2 is unlocked by the locking mechanism 8.

The door of the delivery box 2 is in a so-called automatically locked state in which it is locked at all time before it is used, thereby preventing the delivery box 2 from being used in a prank or as a junk box.

The transmitting/receiving unit 5 is connected to the central computer 10 disposed in the central management center 11 through the Internet 9, the empty state information of a plurality of delivery boxes, the information of the locations of the delivery boxes 2 installed in various districts, the empty information of the delivery boxes 2, and the like, which are stored in a memory of the central computer 10, are transmitted from the transmitting/receiving unit 5 to the CPU 6 through the Internet 9 and further transmitted from the transmitting/receiving unit 5 to the mobile phone 1, the personal digital assistant, the personal computer, and the like as oral, character and image information through the central computer 10 together with the information as to the reception and shipment of articles, the passed-time based usage fee, and the like.

The box-reserving person previously registers a name, an address, a phone number, a mail address, an account number of a bank and the like, a credit card number, a type of the navigation device 20, and the like to the central management center 11 through a register screen (not shown) of a web site (home page) on the Internet 9 supplied by the server device 10*a*, and the usage fee of the delivery box 2 used by the box-reserving person is charged to him or her.

Although this embodiment shows an example that the usage fee is charged to the phone number of the mobile phone 1 previously registered to the central management center 11 by the box-reserving person, the usage fee may be automatically debited to the designated account of a designated and the like or may be paid through a credit card, in addition to that it is charged to the phone number of the mobile phone 1.

The central management center 11 includes a memory 12 acting as storage means for storing the empty state information, which is transmitted from the transmitting/receiving unit 5 at any time, of the delivery boxes 2 installed at the respective locations, and the memory 12 stores the reception and shipment information of articles detected by the infrared ray sensor 3*d* at any time and the various states of the delivery boxes 2 such as the start, and end of a reservation, the cancellation of a reservation, and the like, transmitted from the central computer 10 acting as the empty state detection means at any time while being updated when necessary. Further, the memory 12 stores a series of progress information for a predetermined period.

As described above, the server device 10*a* supplies the empty state information of the delivery boxes 2, which is stored in the memory 12 of the central management center 11 and updated when necessary, on the Internet 9 so that it can be accessed.

Note that the central management center 11 has a call center 11*a* where a staff stays at all times to cope with troubles and inquiries.

FIG. 5 is a flowchart briefly explaining an operation for reserving the delivery box 2 according to the present invention. To reserve the delivery box 2, the box-reserving person selects a district where the delivery box 2 is to be reserved (step S201), selects a location where the delivery box 2 exists (step S202), and selects a box size (step S203), thereby it is displayed that the reservation is finished (step S204), and a reservation confirmation mail is transmitted (step S205).

An example of a procedure for using the delivery box 2 arranged as described above will be explained in detail with reference to FIGS. 6 to 13. First, the operation for reserving the delivery box 2 will be explained with reference to FIGS. 6 and 7.

To reserve the delivery box 2, the central computer 10 of the central management center 11 is accessed from the personal computer, the mobile phone 1, the personal digital assistant, the control panel 3 in the delivery box 2, and the like, which act as the communication means capable of using the Internet 9 as well as act as the input means, through the Internet 9 (step S1 of FIG. 6).

FIGS. 8A to 8K show examples of a display screen displayed in the i mode of the mobile phone 1. In step S2 of FIG. 6, the phone number of the mobile phone 1 (hereinafter, referred to as mobile phone number) and a membership ID number, which are previously registered, are input to a mobile phone number input field 13*a* and a membership ID number input field 13*b* shown in FIG. 8A.

It should be noted that when the mobile phone 1 is in front of the reserved delivery box 2, the mobile phone 1 may inquire the mobile phone number and a personal ID, such as the membership ID number and the like, used for reserving the delivery box 2 by making a phone call to a designated phone number and transmitting the mobile phone 1's own phone number as shown in FIG. 2. When the mobile phone 1 is connected to a mobile phone connecting means 3*i*, the phone number of the mobile phone 1 is transmitted to the controller 4 of the control panel 3, thereby both the mobile phone number and the membership ID number can be input simultaneously.

Further, it is also possible to reserve the delivery box 2 by identifying a membership number by getting ID cards such as a magnetic card, a credit card composed of an IC card and the like, a debit card to which electronic money is transferred from a bank account, and the like read with the card reader 3g and by inputting a member password through the input means 3a composed of the ten keys, and the like.

The mobile phone 1, the personal computer, the personal digital assistant, the control panel 3, and the like also act as reservation selection means for selecting the delivery box 2 whose reservation is desired based on the empty state information of the delivery boxes 2 accessed on the Internet 9 acting as the communication network.

Next, in step S3 of FIG. 6, the content of a job, that is, whether a box is reserved and registered or the content of a reservation made once is cancelled, is selected as shown in FIG. 8B, and when the box is reserved, "1. Reserve box" shown in FIG. 8B is displayed.

Next, in step S4, whether or not a previously registered contract box (box reserved for one month by a contract) is used is selected as shown in FIG. 8C, and when the contract box is not used, "1. No box is contracted" shown in FIG. 8C is fixed.

In next step S5, a reservation desired district is selected from the options of reservation desired districts and highlighted as shown in FIG. 8D. For example, when "4. Sibuya-ku" shown in FIG. 8D is highlighted, a list of locations where empty boxes are available in Shibuya-ku is displayed in step S6 as shown in FIG. 8E, and a desired location (for example, "1. In front of Tokyu Hands") is selected and highlighted. Note that when the mobile phone 1, the personal computer and the personal digital assistant are used, a peripheral map is displayed together with the location.

Next, as shown in FIG. 8F, the sizes of the empty boxes of the delivery box 2 installed in the locations are displayed, and when a box having a desired size is available, a desired box size (for example, "1. L size") is selected and highlighted (steps S7 and S8 of FIG. 6).

Next, an article-leaving person is selected, and when the article-leaving person is a person other than a person of a designated firm, the process goes to step S10 shown in FIG. 7, at which a reservable box number (for example, "C003") is displayed.

When "1. Reservation fixed" shown in FIG. 8G is selected and highlighted in step S11 of FIG. 7, the box "C003" is reserved, a reserved location number "001" of the delivery box 2 installed in front of Tokyu Hands and the reserved box number "003" are combined, thereby "001C003" is set as reserved box ID information.

Then, as shown in FIGS. 8H and 8I, the reserved box ID number "001C003" and, for example, a reservation ID number "*007", which is inherent reservation ID information given to each reserving action, are issued from the central computer 10 of the central management center 11 and displayed (step S12 of FIG. 7), further a reservation expiration date and the like are displayed, and then the access is automatically interrupted (step S13 of FIG. 7).

It should be noted that when an article is one for sale in step S12 shown in FIG. 7 and there are article delivery conditions such as a payment condition to the article which is related to the reservation ID number or reception ID information, a predetermined identification code is added to the reservation ID number. When, for example, a so-called cash on delivery condition, which requires a payment in exchange for the article, is set, an identification code "a" is added to the reservation ID number "*007", thereby a reservation ID number "*007a" is created.

Further, the memory 12 acting as the storage means of the central management center 11 stores the reserved box ID information "001C003", and the reservation ID number "*007" or "*007a", a reservation start time, and further the article delivery conditions and the fulfillment of the condition after they are related to each other.

When the article delivery conditions require a payment in exchange for the article, the central computer 10 of the central management center 11 notifies the reception ID information of the article to a payment agent by transmitting it using a communication means such as an e-mail.

The reserved box ID information "001C003" and the reservation ID number "*007" or "*007a" that are related to each other are transmitted from the central computer 10 of the central management center 11 to the reserved delivery box 2 at the reserved location number "001" through the Internet 9 and stored in the memory 7 of the controller 4 disposed in the control panel 3.

When the reservation is accepted, an instruction for freezing the unlocking executed by the locking mechanism 8 is output from the central computer 10 of the central management center 11 to the controller 4 of the delivery box 2 at the reserved location number "001" by a remote control. Note that when a reserved period of time is exceeded, it is instructed to cancel a reservation (freezing unlocking) from the central computer 10.

That is, in step S14 of FIG. 7, an instruction for temporarily freezing the unlocking of the reserved box is transmitted from the central computer 10 to the CPU 6 of the control panel 3 of the delivery box 2 at the reserved location, and the box-reserving person is notified for reconfirmation with the reservation information such as the reserved box ID information "001C003", the reservation ID number "*007" or "*007a", the reservation start time, and the like through an e-mail as shown in FIGS. 8J and 8K.

Then, when an article is left in the reserved box or the reservation is cancelled within three minutes from the time at which the reservation is fixed in step S15 of FIG. 7, no reservation fee is charged. However, when three minutes has passed from the time at which the reservation is fixed, a predetermined reservation fee is charged to the box-reserving person.

The reservation fee is charged to the phone number of the mobile phone 1 previously registered by the box-reserving person, automatically debited to a bank account, or charged to a credit card and the like. Then, a message that the reservation is effective for only 24 hours is displayed as shown in FIG. 8K.

Further, when a designated firm previously registered in the central management center 11 is selected as the box-reserving person in step S9 shown in FIG. 6, the process goes to step S16 at which the firm is designated, and then the article delivery conditions are input in step S17.

When a payment to an article is made at the delivery box 2, when it is made at a convenience store, a station kiosk, and the like, and when a collection of money and a delivery of an article are executed separately in a mail order service such as e-commerce and the like using a system constructed by a mail order service firm itself or using an independent system, which is dedicated for a payment business using a bank transfer in place of requesting the collection of money to the convenience store and the like (hereinafter, referred to as "separate payment method"), the process goes to step S18 at which a payment number is input and then the process goes to step S10 shown in FIG. 7.

That is, when the delivery box 2 is used to the delivery of the article bought through the mail order service on the cash on delivery condition, a buyer (who is the article-receiving person and is also the box-reserving person of the article) and a seller (who is a sender of the article) previously agree with each other as to the contents and price of the article, a method of payment and delivery, and the like, and then the payment number (for example, a contract number, slip number, and the like) is previously notified from the seller to the buyer.

After it is agreed between the buyer (article-receiving person) and the seller (article-sending person) that the delivery box 2 is used as a payment and delivery means of the article, the seller previously notifies and registers the price of the article to the central management center 11 together with the payment number. Note that, at this time, it is confirmed between the seller and the central management center 11 whether or not the article can be accommodated in the delivery box 2, in size.

Since it is preferable that the seller puts the delivery of the article until the seller confirms that payment to the article is completed, the seller inputs a message that the article will be delivered after the completion of the payment to the article in step S17 shown in FIG. 6.

Whether or not the payment to the article is executed by the separate payment method by means of the CPU 6, which also acts as payment means and is disposed in control panel 3 of the delivery box 2, is inquired to the central computer 10 of the central management center 11 through the communication means such as the transmitting/receiving unit 5 of the control panel 3, the server device 10*a* of the central computer 10, and the like. When it is confirmed that the article delivery conditions are fulfilled and the box ID information and the reception ID information of the delivery box 2 coincide with those stored in the memories 7 and 12 acting as storage means when the reservation is made or the article is left, the delivery box 2 is unlocked by controlling the locking mechanism 8 by the CPU 6 of the control panel 3 acting as the unlocking control means.

When the registered reservation is cancelled in step S3 shown in FIG. 6, the reservation is cancelled by inputting the reserved box ID number composed of the reserved location number and the reservation ID number (steps S19 and S20).

When the previously registered contract delivery box exists in step S4 shown in FIG. 6, the process goes to step S9 and the contact delivery box is reserved executing an operation similar to that described above.

When there is no empty delivery box satisfying the desire in step S7 shown in FIG. 6 or when the reservation is not fixed in step S11 shown in FIG. 7, "2. Cancel" shown in, for example, FIG. 8G is selected and fixed, and the process is finished by interrupting the access (step S21 of FIG. 6).

In FIG. 3, the central management center 11 extracts the position information of the particular delivery box 2 whose reservation is registered from the delivery box position information DB 18 through the central computer 10 that also acts as delivery box position information output means. Position information described as text document data such as "in front of Tokyu hands, first floor of Hasegawa Skyline building, 2-29-20, Dogenzaka, Sibuya-ku, Tokyo", and the like can be employed as the position information.

Navigation execution ID information database (hereinafter, referred to as "navigation execution ID information DB) 19, which acts as navigation execution ID information storage means, stores navigation execution ID information for executing navigation by various types of the navigation devices 20 of the moving bodies previously registered by respective users. The navigation execution ID information causes the the navigation device 20 to execute navigation by automatically inputting moving destination information to the navigation device 20 from the position information of the delivery box 2 that is received from the server device 10*a* of the central management center 11 by the transmitting/ receiving unit 21 through the Internet 9. A program language, for example, "GO NAVI" and the like is appropriately employed as the navigation execution ID information according to an execution program previously set to, for example, a CPU 22 which also acts as navigation execution means of the navigation device 20.

According to the reserved box ID information (for example, "001C003") of the particular reserved delivery box 2, the central computer 10, which also acts navigation execution ID information relating means, relates the position information (for example, "in front of Tokyu hands, first floor of Hasegawa Skyline building, 2-29-20, Dogenzaka, Sibuya-ku, Tokyo") of the particular delivery box 2, which is extracted from the delivery box position information DB 18 to the navigation execution ID information (for example, "GO NAVI") as, for example, "GO NAVI # in front of Tokyu hands, first floor of Hasegawa Skyline building, 2-29-20, Dogenzaka, Sibuya-ku, Tokyo". The navigation execution ID information is previously stored in the navigation execution ID information DB 19 in relation to the phone number of the mobile phone 1 itself, which is transmitted from the mobile phone 1 and serves as personal ID information, and causes the navigation device 20 provided with a user to execute the navigation by inputting the moving destination information to the navigation device 20 based on the phone number and the like. Then, the navigation execution ID information and the position information of the particular delivery box 2, which are related to each other (for example, "GO NAVI # in front of Tokyu hands, first floor of Hasegawa Skyline building, 2-29-20, Dogenzaka, Sibuya-ku, Tokyo"), are transmitted from the server device 10*a* and received by the transmitting/receiving unit 21 of the navigation device 20 of the moving body through the Internet 9.

The navigation execution ID information and the position information of the particular delivery box 2 (for example, "GO NAVI # in front of Tokyu hands, first floor of Hasegawa Skyline building, 2-29-20, Dogenzaka, Sibuya-ku, Tokyo") received by the navigation device 20 of the moving body is stored in a memory 24 acting as storage means at any time, and the navigation is executed by the CPU 22 (central processing unit), which acts as navigation execution means, of the navigation device 20 based on the navigation execution ID information (for example, "GO NAVI"). Further, a route from the present position of the moving body to the moving destination where the particular delivery box 2 is installed is displayed on the display 1*a* acting as the display means of the mobile phone 1 by the navigation device 20 based on the position information of the particular delivery box 2 (for example, in front of Tokyu hands, first floor of Hasegawa Skyline building, 2-29-20, Dogenzaka, Sibuya-ku, Tokyo").

Note that this embodiment explains an example that the navigation device 20 is assembled in the mobile phone 1. However, the route from the present position of the vehicle 26 of a box-reserving person, an article-leaving person, a deliveryman or an article-receiving person, who acts as the moving body, may be displayed on a display acting as display means of the navigation device 20, which is assembled to the vehicle 26 by making use of the navigation device 20 as shown in, for example, FIG. 1. Further, an audio guide from a speaker and the like may be employed to guide the route by the navigation device 20.

For example, when the navigation execution ID information is used separately by the navigation device 20 of the mobile phone 1 and the navigation device 20 of the vehicle 26, "GO NAVI MOBILE PHONE" is appropriately set to, for example, the mobile phone 1, and "GO NAVI AUTO- MOBILE" and the like are appropriately set to, for example, the vehicle 26, respectively as the navigation execution ID information, and the position information of the particular delivery box 2 (for example, "in front of Tokyu hands, first floor of Hasegawa Skyline building, 2-29-20, Dogenzaka, Sibuya-ku, Tokyo") is appropriately related to the navigation execution ID information (for example, "GO NAVI MOBILE PHONE" or "GO NAVI AUTOMOBILE") each set to one of the navigation devices 20 of the mobile phone 1 and the vehicle 26 and the information related to each other is transmitted to the navigation devices 20 of the respective moving bodies.

Next, an operation for leaving and taking out an article will be explained using the flowcharts shown in FIGS. 9 to 13. First, when a user goes to the particular delivery box 2 while guided to the moving destination, where the particular delivery box 2 is installed, by the navigation device 20 of the moving body and stands in front of the control panel 3 of the box 2 as shown in FIG. 4, a human body sensor (not shown) senses the user (step S31 of FIG. 9).

Figure 9:
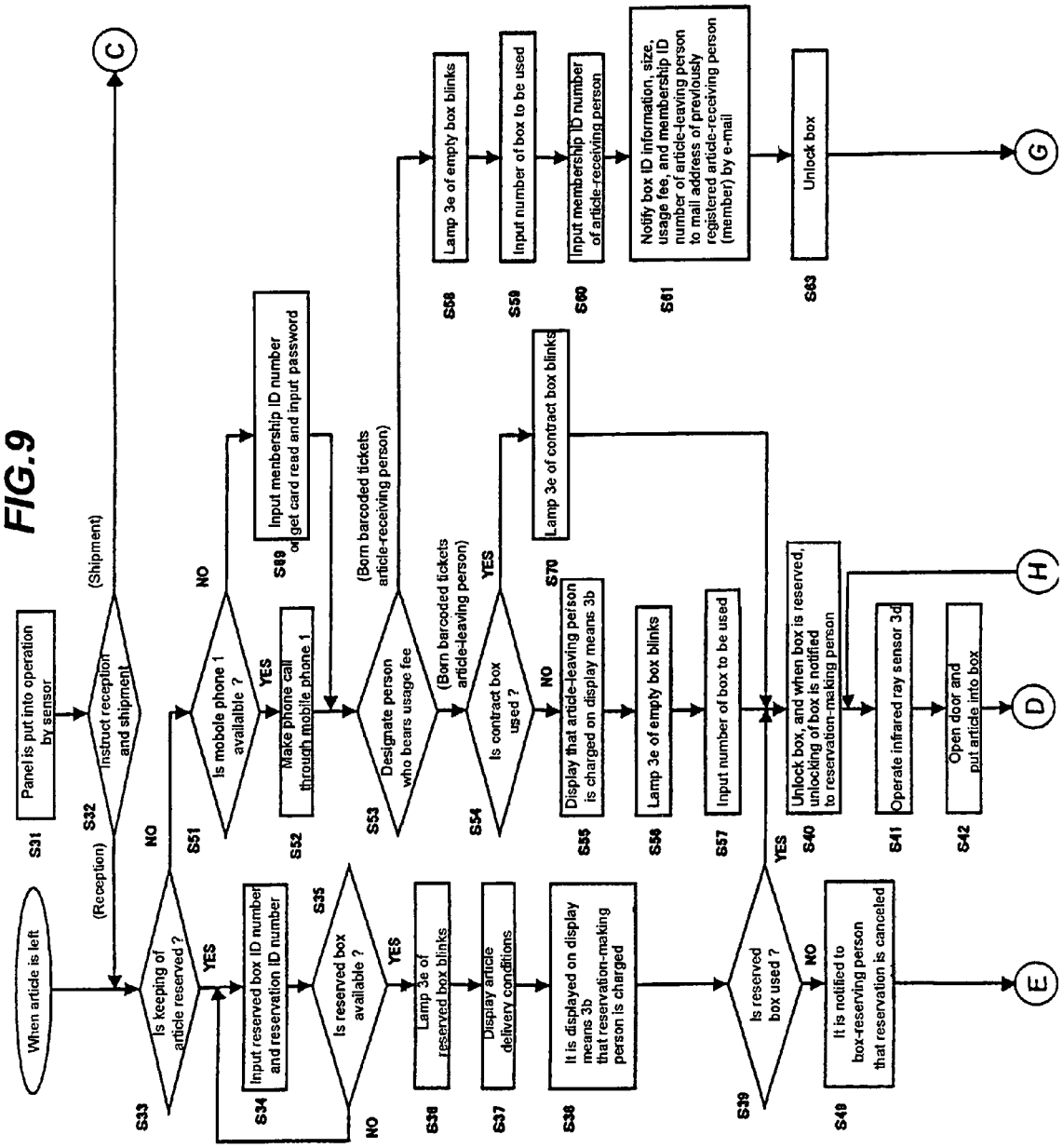
FIG. 9 shows a flowchart showing a sequence when an article is left and when it is received in the delivery box according to the present invention.

Next, the user indicates to receive or to ship an article through the input means 3a of the control panel 3 (step S32 of FIG. 9). When the user selects a job for leaving the article in step S32 shown in FIG. 9, the user selects whether or not leaving of an article is reserved in step S33.

When the leaving of an article is reserved in step S33, the user inputs a reserved box ID number, which is composed of a reserved location number and a reserved box number, and a reservation ID number, which is inherently given to each reserving action, to an inquiry screen 14 displayed on the display means 3b of the control panel 3 shown in FIG. 13 through the input means 3a disposed on the delivery box 2 (step S34 of FIG. 9).

When a box-reserving person, who reserves leaving of an article, is different from an article-leaving person (when, for example, the article-leaving person is a deliveryman), the box-reserving person, who previously gets the reserved box ID number and the reservation ID number, notifies these numbers to the article-leaving person through an e-mail and the like, thereby even a third person, who is not registered to the central management center 11, can leave the article in the reserved delivery box 2.

When the reserved box ID number and the reservation ID number input in step S34 shown in FIG. 9 are checked and it is found that they are authorized numbers (step S35), the lamp 3e of the reserved delivery box 2 blinks (step S36), article delivery conditions, which were preset when the delivery box 2 was reserved, are displayed on the display means 3b (step S37), and further it is displayed on the display means 3b that a reservation fee will be charged to the box-reserving person (step S38 of FIG. 9).

It should be noted that when the reserved box ID number and the reservation ID number input in step S34 are not authorized numbers, a message that "Input authorized reserved box ID number and reservation ID number" is displayed on the display means 3b and the user is prompted to input them again. When the authorized ID numbers cannot be input even if the user inputs them a predetermined number of times, the job is automatically ended. Further, the job can be cancelled by depressing a cancel button (not shown).

Next, whether or not the reserved delivery box 2 is used is selected in step S39 shown FIG. 9, and when the reserved box is used, the process goes to step S40 at which the door of the reserved delivery box 2 is unlocked, and it is notified to the box-reserving person that the door is unlocked.

Figure 10:
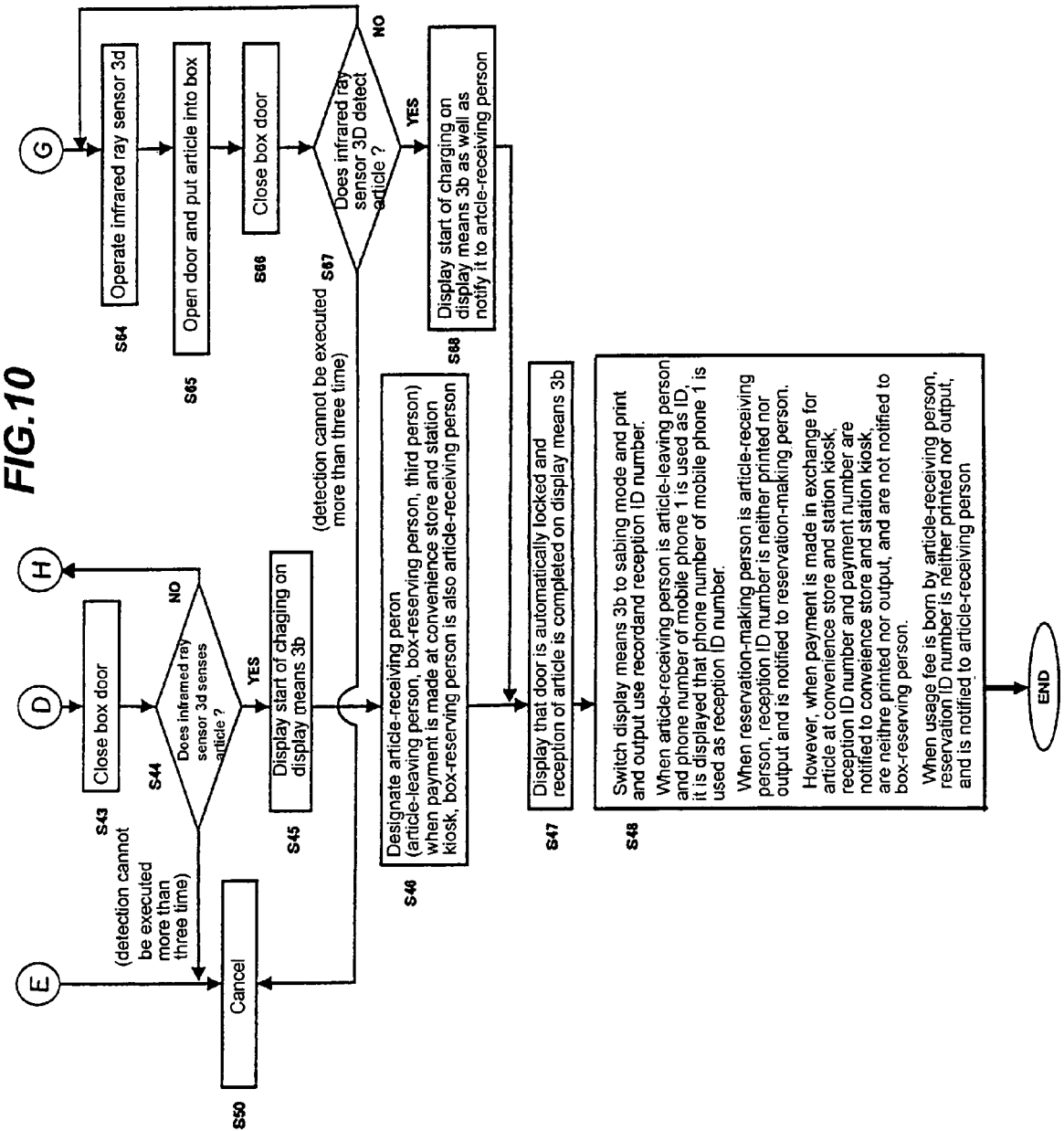
FIG. 10 shows a flowchart showing a sequence when the article is left and when it is received in the delivery box according to the present invention.

Then, the infrared ray sensor 3d is operated (step S41), and when the article is put into the delivery box 2 by opening its door (step S42) and the door is closed (step S43 of FIG. 10), the infrared ray sensor 3d detects the article (step S44 of FIG. 10).

Note that when the infrared ray sensor 3d cannot detect the article in step S44 shown in FIG. 10, a message that "Place article at predetermined position marked" is displayed on the display means 3b, and steps S41 of FIG. 9 to step S44 of FIG. 10 are repeated until the article is detected by the infrared ray sensor 3d. Note that the infrared ray sensor 3d cannot detect the article even if the above steps are repeated three times, the process goes to step S50 of FIG. 10 at which the job is cancelled, and the door of the delivery box 2 is automatically locked.

When the article is detected by the infrared ray sensor 3d in step 11 shown in FIG. 10, a massage that "Usage fee will start to be charged" is displayed on the display means 3b and the usage fee starts to be charged (step S45 of FIG. 10).

The article-leaving person designates the article-leaving person himself, the box-reserving person or a third person as an article-receiving person. When, however, the delivery box 2 is reserved, the box-reserving person is automatically designated as the article-receiving person. Further, when a payment to the article is made through the convenience store or the station kiosk, the box-reserving person is also designated as the article-receiving person.

When the box-reserving person is designated, the door of the delivery box 2 is automatically locked and it is displayed on the display means 3b that the article has been received by the delivery box 2 (step S47 of FIG. 10). Thereafter, the display means 3b is switched to a power saving mode, and a record of use and a reception ID number, which is reception ID information inherent to an article delivery action executed making use of the delivery box 2 are printed and output by the printer 3f (step S48 of FIG. 10).

It should be noted that when the article-receiving person is the article-leaving person as well as the phone number of the mobile phone 1 is used as a personal identification number (ID), it is displayed that the phone number of the mobile phone 1 is used as the reception ID number. Further, when the box-reserving person is the article-receiving person, the reception ID number is not printed and is notified to the box-reserving person. However, when the payment is made in exchange for the article at the convenience store or station kiosk, the reception ID number and the payment number are notified thereto, and they are neither printed nor notified to the box-reserving person. Further, when the usage fee of the delivery box 2 is born by the article-receiving person, the reception ID number is not printed and is notified to the article-receiving person.

Further, when the leaving of an article is not reserved in step S33 shown in FIG. 9, the process goes to step S51, and when the article-leaving person has the mobile phone 1, the phone number of the mobile phone 1 is set as the reception ID number as well as registered to the central management center 11 as an object to which the usage fee is charged, the user selects "Make use of registered mobile phone" and makes a phone call through the mobile phone 1 in step S52 of FIG. 9.

When the article-receiving person has the mobile phone 1, the phone number of the mobile phone 1 itself and the voice of a phone call through the mobile phone 1 can be also used as ID information when the delivery box 2 is reserved and when the door of the delivery box 2 is unlocked to put or take out the article into and from the delivery box 2 and further as an object to which the usage fee of the delivery box 2 is charged.

When the article-receiving person does not have the mobile phone 1 registered in step S51 and the usage fee is automatically debited to a bank account or charged to a credit card and the like, the person selects "Input membership number and password, or get card read and input password" and inputs the membership number and the password, which are previously registered to the central management center 11, through the input means 3a disposed to the control panel 3 of the delivery box 2 or gets the card read with the card reader 3g and inputs the password (step S69 of FIG. 9).

Next, in step S53 shown in FIG. 9, a person who bears the usage fee of the delivery box 2 is designated, and when it is born by the article-leaving person, the process goes to step S54.

Next, "Whether contract delivery box or free delivery box" is selected in step S54, and when a free delivery box 2 is selected, it is displayed on the display means 3b that the usage fee is charged to the article-leaving person (step S55 of FIG. 9), and the lamps 3e of the empty delivery boxes blink (step S56 of FIG. 9).

When a delivery box to be used is selected from the empty delivery boxes and the number of the delivery box is input through the input means 3a (step S57 of FIG. 9), the process goes to step S40 as described above at which the article can be kept in the predetermined delivery box 2.

Further, when the contract delivery box is selected in step S54 shown in FIG. 9, the lamp 3e of the delivery box 2 previously contracted blinks (step S70), and the process goes to step S40 as described above at which the article can be kept in the delivery box 2.

When the usage fee of the delivery box 2 is born by the article-receiving person in step S53 shown in FIG. 9, the process goes to step S58 shown in FIG. 9 at which the lamps 3e of the empty delivery boxes blink, the user selects a delivery box to be used from the empty delivery boxes and inputs the box number thereof through the input means 3a (step S59), and further inputs the membership ID number of the article-receiving person (step S60 of FIG. 9).

The central computer 10 of the central management center 11 notifies the box ID information, the size and the usage fee of the delivery box 2, and the personal information of the article-leaving person based on the membership ID number of the article-leaving person to the previously registered mail address of the article-receiving person through an e-mail based on the membership ID number of the article-receiving person.

The central computer 10 of the central management center 11 unlocks the delivery box 2 by the locking mechanism 8 by controlling the CPU 6 of the control panel 3 of the delivery box 2, (step S63), the infrared ray sensor 3d is operated (step S64 of FIG. 10), the door of the delivery box 2 is opened so that the article is put thereinto (step S65 of FIG. 10), and then the door of the delivery box 2 is closed (step S66 of FIG. 10).

Then, the article is detected by the infrared ray sensor 3d (step S67 of FIG. 10), it is displayed on the display means 3b as well as it is notified to the box-reserving person that the usage fee starts to be charged (step S68 of FIG. 10), and the process goes to step S47 of FIG. 10 at which the article can be kept in the delivery box 2.

When the infrared ray sensor 3d cannot detect the article in step S67 of FIG. 10, a message that "Place article at predetermined position marked", and the like is displayed on the display means 3b, and steps S64 to S67 of FIG. 10 are repeated until the article is detected by the infrared ray sensor 3d. Note that the infrared ray sensor 3d cannot detect the article even if the above steps are repeated three times, the process goes to step S50 of FIG. 10 at which the job is cancelled, and the door of the delivery box 2 is automatically locked.

Further, when the article-leaving person does not use the reserved delivery box in step S39 of FIG. 9 because of some reasons, for example, the article delivery conditions displayed in step S37 are not correct, and the like, the article-leaving person cancels the reservation by depressing the reservation cancel button (not shown), it is notified to the box-reserving person that the reservation is cancelled (step S49 of FIG. 9), and then the process goes to step S50 of FIG. 10 at which the reservation is cancelled.

For example, the article-leaving person such as a deliveryman and the like who leaves the article in the delivery box 2 previously requests the article-receiving person (box-reserving person) to reserve the delivery box 2, and then the article-receiving person reserves the delivery box 2. Further, an initial fee when the delivery box 2 is used may be charged to the article-leaving person who leaves the article.

Moreover, when the article-leaving person gets approval for leaving the article in an empty delivery box from the article-receiving person in front of the delivery box 2 without previously making a reservation, the article-leaving person inputs the box ID number of the empty delivery box 2, the personal ID information of the article-leaving person who leaves the article, and the personal ID information of the article-receiving person of the article through the input means 3a of the control panel 3. With this operation, it is notified to the article-receiving person that the article-leaving person requests to keep the article through the Internet 9 and the central management center 11 based on the personal ID information of the article-receiving person input through the input means 3a. Further, on the reception of the approval from the article-receiving person received the notification, the locking mechanism 8 acting as the unlocking control means unlocks the delivery box 2.

Figure 11:
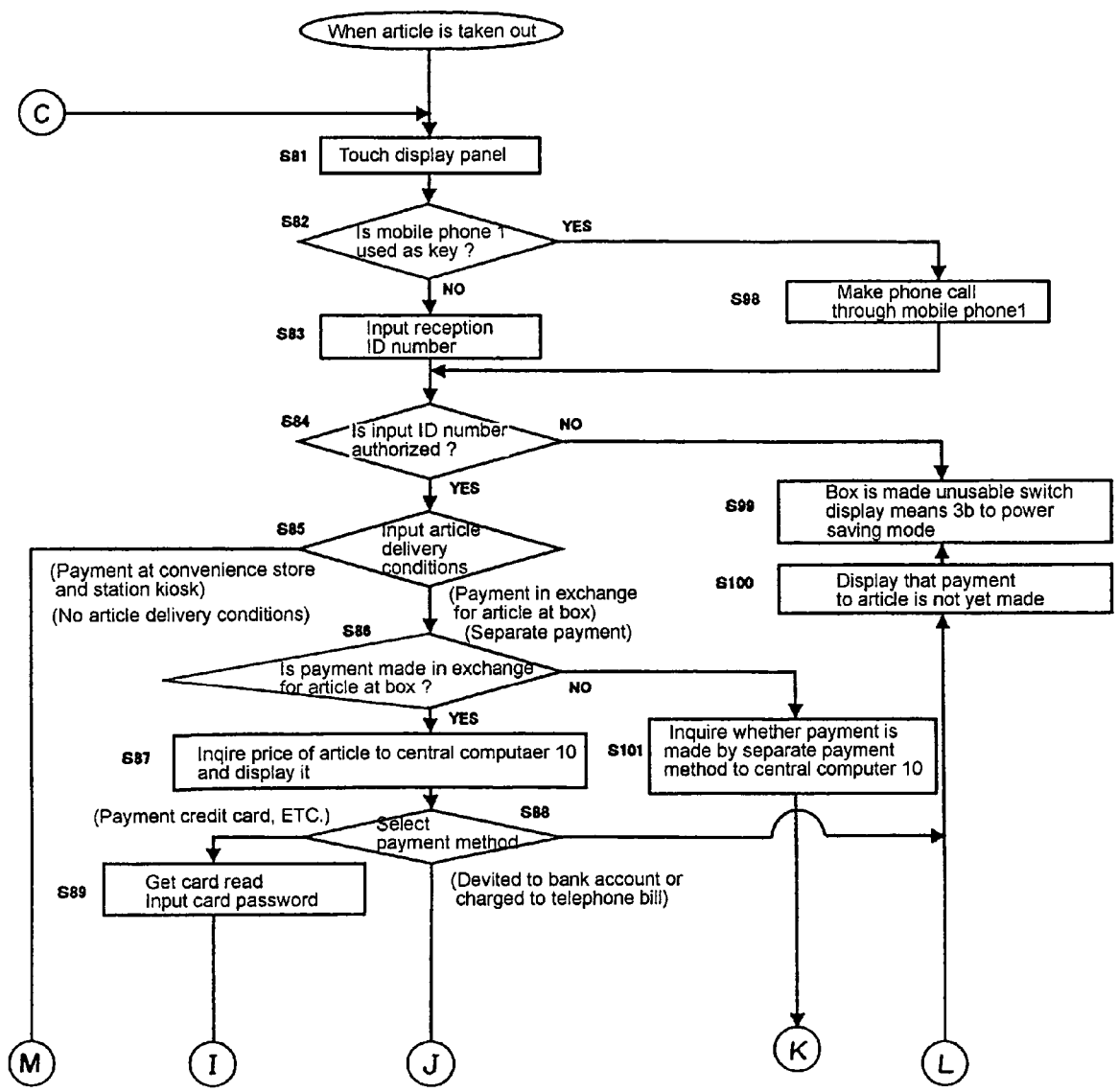
FIG. 11 shows a flowchart showing a sequence when the article is left and when it is received in the delivery box according to the present invention.

When the job for taking out the article is selected in step S32 shown in FIG. 9, the number of the delivery box to be used, which is notified from the article-leaving person or the central management center 11 is touched on the display means (panel) 3b, which also acts as the input mean and disposed to the control panel 3 of the delivery box 2 (step S81 of FIG. 11).

Next, when the phone number of the mobile phone 1 is used as a key in step S82 shown in FIG. 11, a phone call is made through the mobile phone 1 (step S98 of FIG. 11). When the phone number of the mobile phone 1 is not used as the key, the reception ID number is input through the input means 3a disposed to the control panel 3 of the delivery box 2 (step S83 of FIG. 11).

Note that when the phone number of the mobile phone 1 is used as the key when the article is left, the reception ID number is input by making a phone call through the mobile phone 1.

In step S84 shown in FIG. 11, the reception ID number is inquired, and when the reception ID number is an authorized reception ID number, the process goes to step S85 at which article delivery conditions are input. Further, when the input reception ID number is not authorized in step S84, the process goes to step S99 at which the delivery box 2 is made unusable, a message that "Reception id number is not authorized" is displayed on the display means 3b, and then the display means 3b is switched to the power saving mode.

When the input reception ID number is the authorized reception ID number in step S84, if a payment to the article is made in exchange for the article at the delivery box 2 or made separately in step S85, the process goes to step S86, and when the payment is made in exchange for the article at the delivery box 2 in step S86, an inquiry is made to the central computer 10 of the central management center 11, and the previously registered price of the article is displayed on the display means 3b (step S87).

When the article is an article for sale and article delivery conditions exit, the central computer 10 gives an identification number, which corresponds to the identification number given to the reservation ID number, also to the reception ID number. When the reservation ID number with the article delivery conditions is represented by "*007a", which is composed of the ordinary reservation ID number "*007" to which the article delivery conditions identification code "a" is added, the central computer 10 gives "#007a", and the like as a reception ID number with the article delivery conditions.

The central computer 10 searches the reservation ID number corresponding to the reception ID number with identification code therefrom and further searches the payment number input by the article-receiving person (buyer) who is also the box-reserving person when he or she made a reservation. Then, the central computer 10 checks the payment number input by the article-receiving person (buyer) against the payment number registered by the article-leaving person (seller) and extracts the price of the article, which is previously registered to the central management center 11 and necessary to unlock the delivery box 2, from the database stored in the memory 12.

Next, a method of payment is selected in step S88 shown in FIG. 11. When a payment is made by the credit card, the debit card, and the like, the card is read by being inserted into the card reader 3g, the password of the card is input (step S89), and the process goes to step S91 shown in FIG. 12. Further, when the payment is made by debiting the price of the article to the bank account or adding the price to a telephone bill, the previously registered membership ID number is input manually input or the membership ID number composed of the phone number of the mobile phone 1 is input by making a phone call therethrough (step S90 of FIG. 2), and the process goes to step S91 shown in FIG. 12.

When the method of payment is not selected in step S88 shown in FIG. 11, a message that "Payment to article is not yet made", and the like is displayed on the display means 3b (step S100 of FIG. 11), and then the process goes to step S99 at which the delivery box 2 is made unusable. After this is displayed on the display means 3b, the display means 3b is switched to the power saving mode.

When a payment at the delivery box 2 is not selected in step S86 shown in FIG. 11, it is inquired to the central computer 10 that whether or not the payment is made by the separate payment method (step S101 of FIG. 11). This is confirmed in step S102 shown in FIG. 12, and when the completion of payment is confirmed thereat, the process goes to step S91 of FIG. 12.

Figure 12:
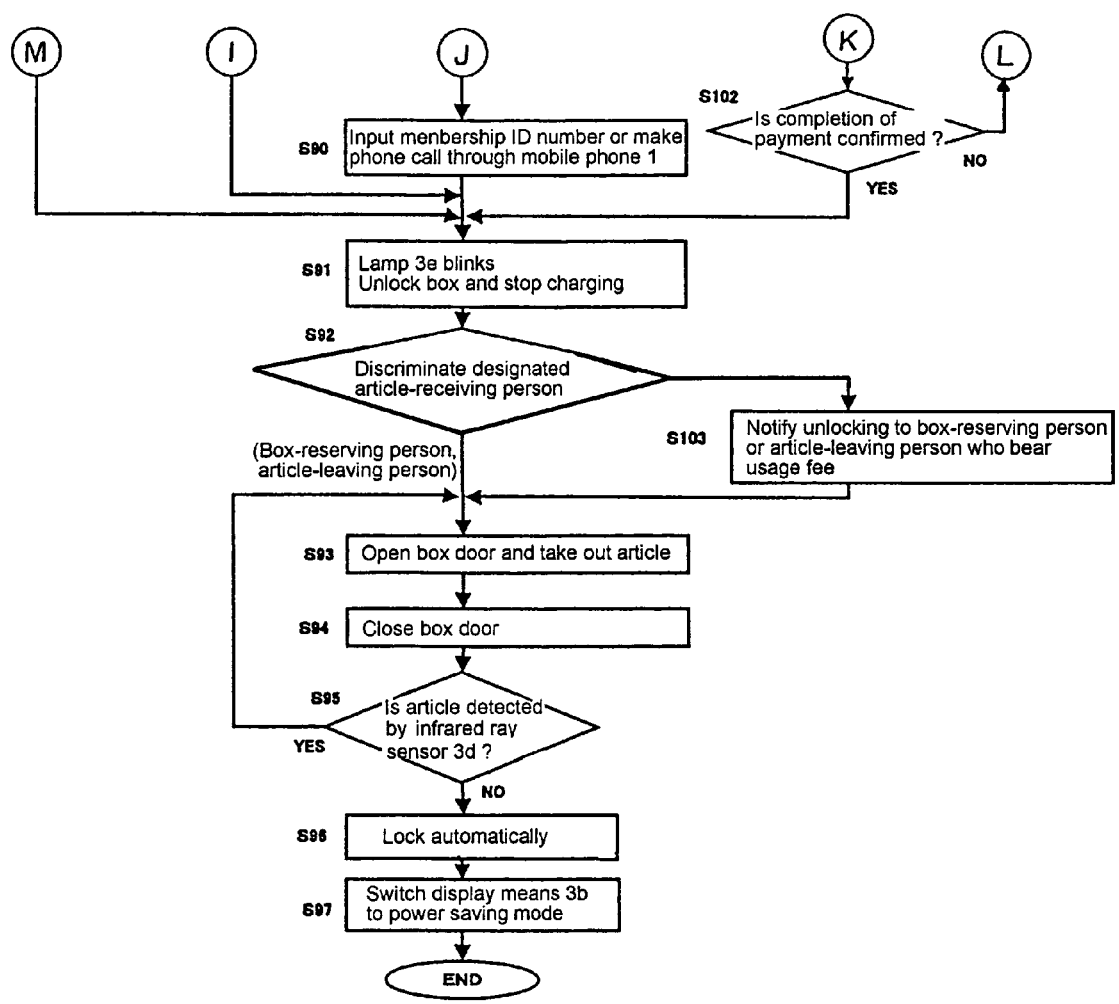
FIG. 12 shows a flowchart showing a sequence when the article is left and when it is received in the delivery box according to the present invention.

When the completion of the payment is not confirmed in step S102 shown in FIG. 12, the process goes to steps S100 and 99 shown in FIG. 11 at which the delivery box 2 is made unusable, this is displayed on the display means 3b, and then the display means 3b is switched to the power saving mode.

In the separate payment method, the seller inputs the confirmation of the completion of payment to the central computer 10 by himself or herself or connects the payment control computer of the seller to the central computer 10 so that the completion of payment can be automatically confirmed.

Further, when the article can be delivered unconditionally because the payment to the article is made through a convenience store or station kiosk or the article is free-charge, the process goes to step S91 shown in FIG. 12.

In step S91 shown in FIG. 12, the door of the designated delivery box 2 having the usage box number is unlocked and the lamp 3e thereof blinks, thereby the usage fee charged to the delivery box 2 is stopped.

In step S92 shown in FIG. 12, the designated article-receiving person is discriminated, and when the designated article-receiving person is the article-leaving person or the box-reserving person, he or she opens the door of the delivery box 2 having the usage box number, takes out the article (step S93), and closes the door of the delivery box 2 (step S94).

Further, in step S92 of FIG. 12, when the designated article-receiving person is a third person, who is not registered in the central management center 11, other than the article-leaving person and the box-reserving person, it is notified to the box-reserving person or the article-leaving person, who is registered to the central management center 11 and to whom the usage fee is charged, that the delivery box 2 was unlocked (step S103 of FIG. 12).

When no article is detected by the the infrared ray sensor 3d (step S95), the door of the delivery box 2 is automatically locked (step S96), and the display means 3b is switched to the power saving mode (step S97). Note that steps S93 to S95 are repeated until no article is detected by the the infrared ray sensor 3d.

When the article-leaving person who leaves the article is, for example, a delivery firm, and the like, the article-receiving person, who receives the article, may reserve the delivery box 2 in response to the request from the delivery firm on behalf of the firm.

Further, a box-reserving person who makes a reservation of a delivery box 2 by making use of it may be previously registered, and the usage fee of the delivery box 2 may be charged to the person. Further, the initial fee when the delivery box 2 is used may be charged to the article-leaving person who leaves the article.

FIG. 14A shows a reservation making procedure in diagrammatic form. First, a deliveryman as an article-leaving person requests an article-receiving person as a box-reserving person to reserve a delivery box 2 (1), and then the article-receiving person designates a locker to be reserved of the delivery box 2 (2). Note that although there is a case that only an article is delivered, when, in particular, a payment must be made to the article simultaneously with the delivery thereof (hereinafter, referred to as "cash on delivery"), cash on delivery is instructed to the central management center 11 at process (2).

Thereafter, a reservation ID number and a reserved locker number are notified from the central management center 11 to the article-receiving person as the the box-reserving person (3).

The article-receiving person notifies the reservation ID number and the reserved locker number to a deliveryman (3)'. Further, when the article-receiving person inputs the registered ID number of the deliveryman at process (2), the reservation ID number and the reserved locker number are also notified to the deliveryman from the delivery box 2.

FIG. 14B shows an article reception and shipment action in diagrammatic form. The deliveryman, who is notified with the reservation ID number and the reserved locker number at (3)' or (3)" shown in FIG. 14A, goes to the delivery box 2, inputs the reservation ID number and the reserved locker number, and puts an article into the delivery box 2 (4).

When the article is left in the delivery box 2, a reception ID number is notified from the central management center 11 to the article-receiving person by an e-mail (5). The article-receiving person inputs the reception ID number and an personal ID number (8) and takes out the article from the delivery box 2 (9).

Note that although there is the case that only the article is delivered, when a payment must be made to the article simultaneously with the delivery thereof, the cost of the article may be automatically debited to a designated account by inserting the credit card, the debit card and the like into the card reader 3g disposed to the control panel 3 of the delivery box 2 or may be added a telephone bill by making a phone call through the mobile phone 1.

In the case of the cash on delivery, the cost and the like of the article are called from the central computer 10 and displayed on the display means 3b after the process (8), and the payment to the article is made by getting various cards such as the credit card, the debit card and the like read or by making a phone call through the mobile phone 1.

FIG. 14C is shows a case that the convenience store, the station kiosk, and the like make a payment on behalf of the article-receiving person. In this case, the deliveryman, who is notified with the reservation ID number and the reserved locker number at the processes of (3)' or (3)" shown in FIG. 14A, is guided to the delivery box 2 by the navigation device 20, puts the article into the delivery box 2 by inputting the reservation ID number and the reserved locker number (4).

When the article is left in the delivery box 2, the reception ID number is notified to the convenience store, the station kiosk, and the like, which are previously registered, from the central management center 11 through an e-mail (5). The convenience store, the station kiosk, and the like may be located in the vicinity of the delivery box 2 or may be designated by the article-receiving person. Further, there may be a case that the convenience store, the station kiosk, and the like also act as a deliveryman who leaves an article in a delivery box 2.

In contrast, since the article-receiving person is previously notified with a scheduled arrival date and the like of an article from a seller by a slip before the article is passed to a deliveryman, the article-receiving person reserves a delivery box 2 based on the scheduled arrival date, goes to the convenience store, the station kiosk and the like, passes the slip to them as well as makes a payment to the article (6), and receives a reception ID number (7).

On receiving the reception ID number, the article-receiving person goes to the delivery box 2, inputs the reception ID number and the personal ID number (8)', and takes out the article from the delivery box 2 (9)'.

When cash on delivery is designated in the process (2) of FIG. 14A, an identification number showing the cash on delivery is added to the reception ID number. As a result, a payment by the card and the like may be added to the condition of shipment in the process (9) as shown in FIG. 14B, or the reception ID number may be presented or notified to a payment agent at process (5) of FIG. 14C.

That is, the memory 12, which acts as the storage means of the central computer 10, stores article delivery conditions such as a payment condition and the like which are related to the reservation ID number as the reservation ID information inherent to the reservation made by the box-reserving person (article-receiving person) of the delivery box 2 or inherent to the reserving action issued by the central management center 11 when the article-leaving person is accepted to leave the article or which are related to the reception ID number as the reception ID information inherent to the article delivery action executed making use of the delivery box 2. When the article delivery conditions are accompanied with the payment condition, the reception ID number is notified only to the payment agent such as the convenience store, the station kiosk or the like by an e-mail and the like acting as communication means. The reception ID number, which is necessary to unlock the delivery box 2, is notified at the time the convenience store, the station kiosk, and the like have fulfilled the article delivery conditions by making the payment to the article, thereby the delivery box 2 can be unlocked.

As an example of utilizing the present invention, the present invention can be applied to a delivery box system such as a mail box (including post office box), a home delivery box, a cleaning box, a coin locker, and the like through which articles are delivered, and to a reserving method and a charging method making use of the delivery box system.

Since the present invention has the arrangement and the working-effect described above, there can be provided the delivery box system arranged such that delivery boxes are installed not only in complex housing such as apartment houses and the like but also in public locations such as the peripheries of stations, underground shopping arcades, shopping streets, and urban areas and the like where many persons gather, a moving object can be guided to a moving destination while it is moving, an article-receiving person can easily reserve and use a delivery box, security can be improved by issuing a reservation ID number inherent to each reserving action, delivery of an article can be made on the condition of cash on delivery, and the article can be delivered after the approval of the article-receiving person is previously obtained as to an article delivery place and who bears the usage fee of the delivery box.

What is claimed is:

1. A delivery box system for delivering an article comprising:

box position information storage means for storing position information of the positions where delivery boxes are installed;

delivery box position information output means for outputting position information of a particular delivery box to be used from the position information stored in the box position information storage means;

navigation means for measuring a present position of a moving body, displaying the present position of the moving body in map information corresponding to the present position of the moving body based on the measured position information as well as enabling the navigation means to guide the moving body from the present position thereof to the moving destination where the particular delivery box is installed based on the position information of the particular delivery box;

navigation execution ID information relating means for relating the position information of the particular delivery box output by the delivery box position information output means to navigation execution ID information for executing navigation by inputting moving destination information to the navigation means; and navigation execution means for receiving the navigation execution ID information and the position information of the particular delivery box that are related to each other by the navigation execution ID information relating means, executing the navigation by the navigation means based on the navigation execution ID information as well as guiding the moving body from the present position thereof to the moving destination where the particular delivery box is installed by the navigation means based on the position information of the particular delivery box.

2. A delivery box system according to claim 1, comprising:
  a mobile phone capable of transmitting ID information; and
  unlocking control means for unlocking the delivery box by receiving the ID information transmitted from the mobile phone through a transmitting/receiving unit having a phone function and checking the ID information between the mobile phone and the transmitting/receiving unit.

3. A delivery box system according to claim 2, wherein the ID information is any one of phone number information of the mobile phone itself, ID number information, and voice print information or a combination of them.

4. A delivery box system according to claim 2, wherein the mobile phone can utilize the Internet and obtain at least one of installed position information of the delivery boxes, usage fee information based on a passed time, article reception/shipment information, and empty state information through the Internet.

5. A delivery box system according to claim 2, wherein the usage fee of the delivery box is charged to the phone number of the mobile phone.

6. A delivery box system according to claim 2, wherein unlocking of the delivery box is frozen by remote control to reserve the delivery box from the mobile phone.

7. A delivery box system according to claim 1, comprising:
  empty state detection means for detecting an empty state of the delivery boxes;
  first communication means for collecting empty state information detected by the empty state detection means and transmitting it to a central management center;
  first storage means for storing the empty state information transmitted to the central management center at any time;
  a server device for presenting the empty state information stored in the first storage means on a communication network such that it can be accessed;
  reservation selection means for selecting a delivery box the reservation of which is desired based on the empty state information accessed on the communication network;
  second storage means for storing reserved box ID information of the delivery box selected by the reservation selection means and reservation ID information, which is related to ID information such as the phone number and the like of the mobile phone of a box-reserving person that is inherent to a reserving action issued by the central management center when the reservation is accepted in a state that the reserved box ID number is related to the reservation ID information;
  second communication means for transmitting and notifying the reserved box ID information and the reservation ID information to the box-reserving person;
  input means for inputting the reserved box ID information of the delivery box and the reservation ID information; and
  unlocking control means for checking the reserved box ID information and the reservation ID information input by the input means against the reserved box ID information and the reservation ID information stored in the second storage means and unlocking the delivery box when the former information coincides with the latter information.

8. A delivery box system according to claim 7, wherein the input means and/or the second to fourth communication means are any one of a mobile phone, a personal digital assistant, a personal computer, and ten keys and a touch panel disposed to the delivery box.

9. A delivery box system according to claim 8, wherein the mobile phone, the personal digital assistant, the personal computer, and the ten keys and the touch panel disposed to the delivery box can make use of the Internet and obtain at least one of installed position information of the delivery boxes, usage fee information based on a passed time, article article reception/shipment information, empty state information, article keeping request information, and article keeping acceptance information through the Internet.

10. A delivery box system according to claim 7, wherein the input means and/or the second to fourth communication means are the mobile phone, and the phone number of the mobile phone or the voice of a call therethrough also acts as authentication information when the delivery box is reserved or when the article is left or taken out or is used to charge the usage fee of the delivery box.

11. A delivery box system according to claim 1, comprising:
  input means for inputting reservation ID information, which is related to ID information such as the phone number and the like of the mobile phone of a box-reserving person that is inherent to a reserving action issued by the central management center when the reservation of the delivery box or keeping of an article is accepted or for inputting article delivery conditions such as payment to the article, and the like which are related to reception ID information that is related to ID information such as the phone number and the like of the mobile phone inherent to the delivery action of the article executed making use of the delivery box;
  storage means for storing the article delivery conditions and the fulfillment thereof;
  third communication means for transmitting and notifying the reception ID information only to a payment agent when the article delivery conditions are accompanied with payment for the article;
  payment means for making payment to the article; fourth communication means for inquiring the fulfillment of payment by a separate payment method by transmitting the inquiry to the central management center; and
  unlocking control means for unlocking the delivery box when the box ID information of the delivery box and the reception ID information coincide with those stored when the reservation or the keeping of the article is accepted after it is confirmed that the article delivery conditions are fulfilled.

12. A method of reserving a delivery box for delivering an article, comprising the steps of:

requesting an article-receiving person, who receives an article, to reserve a delivery box according to claim 1 by an article-leaving person who leaves the article; and reserving the delivery box by the article-receiving person on behalf of the article-leaving person.

13. A method of charging the fee of a delivery box for delivering an article, comprising the steps of:

previously registering a box-reserving person who makes a reservation making use of the delivery box according to claim 1; and charging the fee of the delivery box to the reservation-making person.

14. A method of charging the fee of a delivery box for delivering an article, comprising the step of:

charging an initial fee when the delivery box according to claim 1 is used to an article-leaving person who leaves an article.

* * * * *